United States Patent
Chauvin et al.

(10) Patent No.: US 12,443,503 B2
(45) Date of Patent: Oct. 14, 2025

(54) COMPUTER PERIPHERAL REPORT RATE AND DISPLAY REFRESH RATE SYNCHRONIZATION

(71) Applicant: Logitech Europe S.A., Lausanne (CH)

(72) Inventors: Nicolas Chauvin, La Rippe (CH); François Scholder, Crissier (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 18/426,167

(22) Filed: Jan. 29, 2024

(65) Prior Publication Data

US 2025/0245114 A1    Jul. 31, 2025

(51) Int. Cl.
G06F 11/30    (2006.01)
G06F 11/34    (2006.01)

(52) U.S. Cl.
CPC ...... G06F 11/3051 (2013.01); G06F 11/3438 (2013.01); G06F 11/3476 (2013.01)

(58) Field of Classification Search
CPC ............. G06F 11/3051; G06F 11/3438; G06F 11/3476
See application file for complete search history.

(56) References Cited

U.S. PATENT DOCUMENTS

2015/0220413 A1* 8/2015 Hindi ................. G06F 11/1471
                                                714/6.23
2022/0113996 A1* 4/2022 Brdiczka ................ G06N 20/00

FOREIGN PATENT DOCUMENTS

CN    113609429 B  *  4/2024   ........... G06F 16/958

OTHER PUBLICATIONS

Translation of CN-113609429-B (Year: 2024).*
"Autoregressive Integrated Moving Average", Available Online at: https://en.wikipedia.org/wiki/Autoregressive_integrated_moving_average, 8 pages.
"Autoregressive Moving-Average Model", Available Online at: https://en.wikipedia.org/wiki/Autoregressive_moving-average_model, 8 pages.
"Beat (Acoustics)", Available Online at: https://en.wikipedia.org/wiki/Beat_(acoustics), 4 pages.
"Cut Your PC's Latency in Half with NVIDIA Reflex", Available Online at: https://www.youtube.com/watch?v=uphkMC7fZx8, May 24, 2022, 4 pages.

(Continued)

*Primary Examiner* — Henry Tsai
*Assistant Examiner* — John B Roche
(74) *Attorney, Agent, or Firm* — Kilpatrick Townsend & Stockton LLP

(57) ABSTRACT

A computer-implemented method comprising receiving, by an input device from a host computing device, a display refresh rate for a display, both the display and the input device being communicatively coupled to the host computing device. The method further includes computing, by the input device, a frequency multiplier based on the display refresh rate and a selected report rate of the input device, the report rate corresponding to a frequency at which the input device reports activity of the input device to the host computing device and calibrating, by the input device, the report rate to a new report rate based on the computed frequency multiplier. The method may further include reporting activity of the input device to the host computing device at the new report rate.

20 Claims, 14 Drawing Sheets

(56) References Cited

OTHER PUBLICATIONS

"Forecasting", Available Online at: https://en.wikipedia.org/wiki/Forecasting, 14 pages.
"State-Space Representation", Available Online at: https://en.wikipedia.org/wiki/State-space_representation, 12 pages.
Burnes, "NVIDIA Reflex Ecosystem Continues to Expand With New Games, 1440p 360Hz Monitors & GeForce NOW Support", Available Online at: https://www.nvidia.com/en-us/geforce/news/ces-2023-reflex-games-1440p-360hz-monitors/, Jan. 3, 2023, 7 pages.
Ham, et al., "Do We Need a Faster Mouse? Empirical Evaluation of Asynchronicity-induced Jiter", Available Online at: https://dl.acm.org/doi/pdf/10.1145/3472749.3474783, Oct. 10-14, 2021, pp. 743-753.
Lin, et al., "Nvidia Dlss 3: AI-Powered Performance Multiplier Boosts Frame Rates by Up to 4X", Available Online at: https://www.nvidia.com/en-us/geforce/news/dlss3-ai-powered-neural-graphics-innovations/, Sep. 20, 2022, 8 pages.
Poncelet, et al., "Tracking Visual Events in Time in the Absence of Time Perception: Implicit Processing at the ms Level", Research Article, Jun. 1, 2015, pp. 1-24.
Potter, et al., "Detecting Meaning in RSVP at 13 ms Per Picture", Attention, Perception, & Psychophysics, vol. 76, 2014, pp. 270-279.
Schneider, "Introducing NVIDIA Reflex: Optimize and Measure Latency in Competitive Games", Available Online at: https://www.nvidia.com/en-us/geforce/news/reflex-low-latency-platform/, Sep. 1, 2020, 30 pages.
Sterling, "John Carmack's Latency Mitigation Strategies", Available Online at: https://www.wired.com/2013/02/john-carmacks-latency-mitigation-strategies/, Feb. 24, 2013, 10 pages.

* cited by examiner

COMPUTER PERIPHERAL REPORT RATE AND DISPLAY REFRESH RATE SYNCHRONIZATION

BACKGROUND

Computer peripheral devices such as computer mice and keyboards remain the primary interface between user and computer. There have been significant advancements in both over the past few decades with improvements in ergonomics, robustness, and performance. Gaming-grade devices typically have the best performance characteristics. For instance, gaming mice and keyboards often have high quality keys and/or buttons with excellent feedback profile characteristics, configurable parameters, and lighting effects.

One performance metric that has become increasingly important and gaming peripheral devices is the report rate. The report rate corresponds to how frequently the computer peripheral device reports user activity to a paired host computing device. Generally, a faster report rate is preferred over slower report rates, but often may come at a cost such as increased power requirements or higher price. For example, for a given velocity of a computer mouse, a faster report rate typically involves computing a larger number of smaller incremental displacements, resulting in summing or accumulating a larger number of small displacement errors, thus degrading the accuracy of the reported trajectory. Despite significant improvements in report rates over recent years, other downstream systems can often introduce latency and jitter to the overall communication chain that can reduce or eliminate much of the benefit that the faster report rates may present. Better solutions are needed to improve or compensate for these deleterious effects.

BRIEF SUMMARY

In certain embodiments, a computer-implemented method comprises: requesting, by a host computing device, a display refresh rate of a display, the display communicatively coupled to the host computing device; receiving, by the host computing device from the display, the display refresh rate; sending, by the host computing device to an input device, the display refresh rate, the input device communicatively coupled to the host computing device; computing, by the input device, a frequency multiplier based on the display refresh rate and a selected report rate of the input device, the report rate corresponding to a frequency at which the input device reports activity of the input device to the host computing device; calibrating, by the input device, the report rate to a new report rate based on the computed frequency multiplier; and reporting activity of the input device at the new report rate. In some implementations, an operating system (OS) operating on the host computing device requests and receives the display refresh rate from the display, a computer peripheral controlling software operating on the host computing device requests and receives the display refresh rate from the display, or a game engine requests and receives the display refresh rate from the display. In some aspects, the selected report rate is a user-defined report rate.

In some embodiments, the input device is communicatively coupled to the host computing device via a human interface device (HID)-type communication protocol. The input device can be a computer mouse or other suitable computer peripheral device. The method can further include: requesting, by the host computing device, a second display refresh rate of a second display, the second display communicatively coupled to the host computing device; receiving, by the host computing device from the second display, the second display refresh rate; sending, by the host computing device to an input device, the second display refresh rate; computing, by the input device, a second frequency multiplier based on the second display refresh rate and the selected report rate of the input device; calibrating, by the input device, the report rate to a second new report rate based on the computed second frequency multiplier; reporting activity of the input device at the new report rate when the input device is interfacing with the display; and reporting activity of the input device at the second new report rate when the input device is interfacing with the second display. In certain embodiments, the method further includes modifying, by the input device, a dots-per-inch (DPI) setting of the input device based on the new report rate when the input device is interfacing with the display; and modifying, by the input device, DPI setting of the input device based on the second new report rate when the input device is interfacing with the second display.

In some embodiments, a computer-implemented method can comprise: receiving, by an input device from a host computing device, a display refresh rate for a display, both the display and the input device being communicatively coupled to the host computing device; computing, by the input device, a frequency multiplier based on the display refresh rate and a selected report rate of the input device, the report rate corresponding to a frequency at which the input device reports activity of the input device to the host computing device; calibrating, by the input device, the report rate to a new report rate based on the computed frequency multiplier; and reporting activity of the input device at the new report rate. In some implementations, an operating system (OS) operating on the host computing device requests and receives the display refresh rate from the display, a computer peripheral controlling software operating on the host computing device requests and receives the display refresh rate from the display, or a game engine requests and receives the display refresh rate from the display. The selected report rate can be a user-defined report rate. The input device can be communicatively coupled to the host computing device via a human interface device (HID)-type communication protocol. The input device can be a computer mouse or other suitable input device (e.g., computer peripheral device).

In some aspects, the method can further include requesting, by the host computing device, a second refresh rate of a second display, the second display communicatively coupled to the host computing device; receiving, by the host computing device from the second display, the second display refresh rate; sending, by the host computing device to an input device, the second display refresh rate; computing, by the input device, a second frequency multiplier based on the second display refresh rate and the selected report rate of the input device; calibrating, by the input device, the report rate to a second new report rate based on the computed second frequency multiplier; reporting activity of the input device at the new report rate when the input device is interfacing with the display; and reporting activity of the input device at the second new report rate when the input device is interfacing with the second display.

In some embodiments, a computer-implemented method comprises: receiving, by a computing device, a display refresh rate for a display, both the display and the computing device being communicatively coupled to a host computing device; receiving, by the computing device from an input device, human interface device (HID)-type reports at a report rate, the HID-type reports including data corresponding to a motion of the input device; computing, by the computing device from an input device, a state-space model for the motion of the input device based on the HID-type reports; sampling, by the computing device, new motion reports based on the state-space model at a new report rate that is a same frequency or an integer multiple thereof of the display refresh rate; and reporting the new motion reports to the host computing device at the new report rate. In some implementations, the computing device can be one of a radio-frequency (RF) receiver, computer peripheral controlling software; operating system; or game engine running inside a game software. In some cases, the state-space model includes a velocity and/or acceleration and/or jerk of the input device. In certain embodiments, the state-space model is processed using a Kalman-type filter. The input device can be a computer mouse. In some cases, the computing device receives the display refresh rate from a computer peripheral device controlling software operating on the host computing device.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which.

Throughout the drawings, it should be noted that like reference numbers are typically used to depict the same or similar elements, features, and structures.

DETAILED DESCRIPTION

Aspects of the present disclosure relate generally to computer peripheral devices, and more particularly to reducing jitter and synchronizing hardware operating characteristics for improved performance, according to certain embodiments.

In the following description, various examples of report rate and display rate synchronization are described, among other myriad topics. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high-level summary is intended to provide a basic understanding of some of the novel innovations depicted in the figures and presented in the corresponding descriptions provided below. Aspects of the invention relate to a myriad of topics that include reducing the latency between the user hand motion and the motion received by software (e.g., a video game) down to zero latency, and reducing the jitter between the user hand motion and the motion received by a display screen by adapting the mouse motion report rate (also referred to as a polling rate) to match an integer multiple of the display screen refresh rate, which can be extended to multiple displays having different display resolutions and display refresh rates. Aspects in the present application further describe increasing the mouse motion report rate seen by an operating system (OS) at wireless receiver up to 8 kHz and faster, or directly integrated into driver software at the OS level or game engine level (e.g., synchronized with the game engine loop), without increasing the wireless radio transmission report rate. Aspects of the present disclosure are further directed to encoding and compressing motion information sent from a computer peripheral device sensor (e.g., optical mouse sensor) to a software game engine or a software application, and reducing the wireless computer peripheral device power consumption by sending a lower amount of encoded compressed wireless reports to the wireless receiver.

It is to be understood that this high-level summary is presented to provide the reader with a baseline understanding of some of the novel aspects of the present disclosure and a roadmap to the details that follow. This high-level summary in no way limits the scope of the various embodiments described throughout the detailed description and each of the figures referenced above are further described below in greater detail and in their proper scope.

Figure 1:
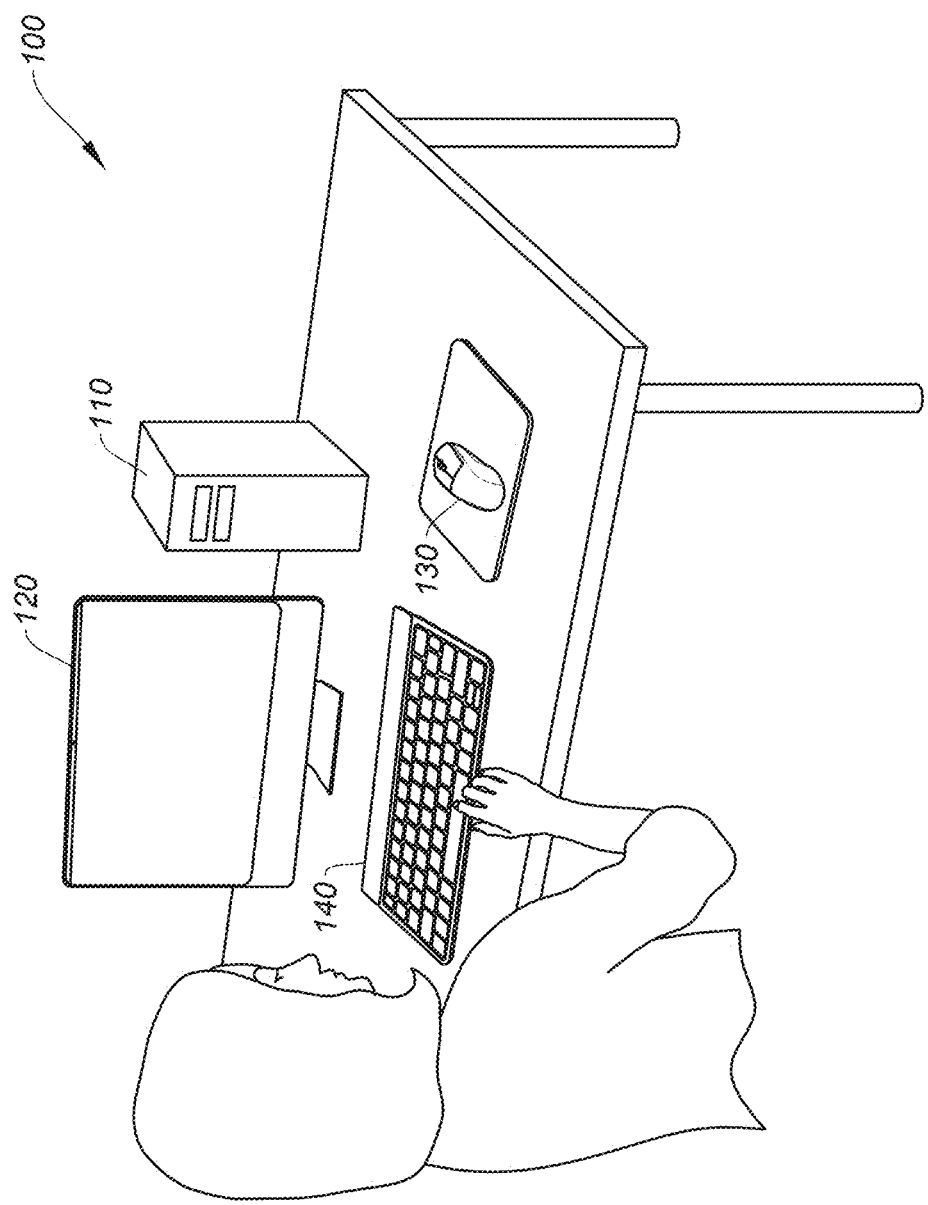
FIG. 1 shows a simplified example of a computer system that can include any of a variety of host computing devices and computer peripheral devices, according to certain embodiments.

FIG. 1 shows a simplified example of a computer system 100 that can include any of a variety of host computing devices and computer peripheral devices, including computer peripheral devices (e.g., a computer mouse, keyboard, etc.) that can be configured to perform aspects of the various inventive concepts described herein. Computer system 100 can include computer 110, monitor 120, computer mouse ("mouse") 130, and keyboard 140. In some embodiments, computer mouse 130 can be any suitable computer peripheral device (e.g., input device), such as a remote-control device, a game controller (e.g., game pad, joystick, flight stick, etc.) or elements thereof (e.g., hat switch), or other suitable device that can be used to convert analog inputs into digital signals for computer processing. For computer system 100, input devices 130 and 140 can be configured to control various aspects of computer 110 and monitor 120, as would be appreciated by one of ordinary skill in the art with the benefit of this disclosure. The monitor 120 (also referred to as a "display," "display device," "display monitor," and the like), computer mouse 130, and keyboard 140 may be referred to as "computer peripheral devices" or "input devices." Computer peripheral devices 120-140 can be communicatively coupled to host computing device 110. Although many of the inventive embodiments presented herein are shown as applied to computer mice, it would be understood by those of ordinary skill in the art with the benefit of this disclosure that the usage of the latency/jitter reduction and report rate improvements described throughout can be applied to other types of computer peripheral devices.

Computer 110 can be any suitable computing device including, but not limited to, a desktop computer, a laptop computer, a tablet or "phablet" computer, a smart phone, a PDA, a wearable device (e.g., smart watches, smart glasses), virtual reality/augmented reality (AR/VR) system, or the like. A host computing device may also be referred to herein as a "host computer," "host device," "computing device," "computer," or the like, and may include a machine-readable medium (not shown) configured to store computer code, such as driver software, firmware, and the like, where the computer code may be executable by one or more processors of the host computing device(s) (see, e.g., processor 210 of FIG. 2) to control aspects of the host computing device, for instance, via the one or more computer peripheral devices.

Figure 2:
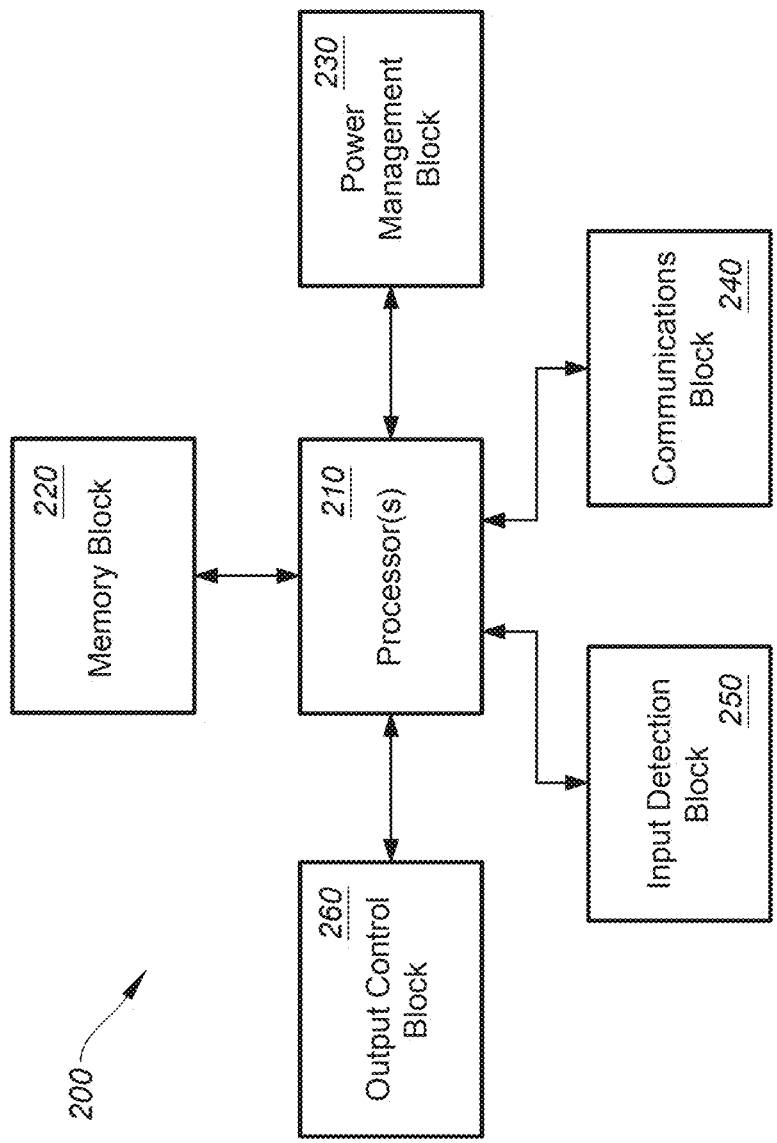
FIG. 2 shows a system for operating a computer peripheral device, according to certain embodiments.

FIG. 2 shows a system 200 for operating a computer peripheral device (e.g., computer mouse 130, keyboard 140, etc.), according to certain embodiments. System 200 may be configured to operate any of the computer peripheral devices shown or not shown herein but within the wide purview of the present disclosure. System 200 may include processor(s) 210, memory 220, a power management system 230, a communication module 240, an input detection module 250, and an output control module 260. Each of the system blocks 220-260 can be in electronic communication with processor(s) 210 (e.g., via a bus system). System 200 may include additional functional blocks that are not shown or discussed to prevent obfuscation of the novel features described herein. System blocks 220-260 (also referred to as "modules") may be implemented as separate blocks, or alternatively, more than one system block may be implemented in a single block. In the context described herein, system 200 can be incorporated into any computer peripheral device described or mentioned herein and may be further configured with any of the novel embodiments presented herein (see, e.g., FIGS. 6, 13, 14), as would be appreciated by one of ordinary skill in the art with the benefit of this disclosure.

In certain embodiments, processor(s) 210 may include one or more microprocessors and can be configured to control the operation of system 200. Alternatively or additionally, processor(s) 210 may include one or more microcontrollers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of computer mouse 130 (e.g., system blocks 220-260). Alternatively or additionally, some of system blocks 220-260 may include an additional dedicated processor, which may work in conjunction with processor(s) 210. For instance, MCUs, µCs, DSPs, and the like, may be configured in other system blocks of system 200. Communications block 240 may include a local processor, for instance, to control aspects of communication with host computer 110 (e.g., via Bluetooth, Bluetooth LE, RF, IR, hardwire, ZigBee, Z-Wave, Logitech Unifying®, Logitech Lightspeed®, or other communication protocol). Processor(s) 210 may be local to the computer peripheral device (e.g., contained therein), may be external to the computer peripheral device (e.g., off-board processing, such as by a corresponding host computing device), or a combination thereof. Processor(s) 210 may perform any of the various functions and methods described and/or covered by this disclosure in conjunction with any other system blocks in system 200. In some implementations, processor 302 of FIG. 3 may work in conjunction with processor 210 to perform some or all of the various methods described throughout this disclosure. In some embodiments, multiple processors may enable increased performance characteristics in system 200 (e.g., speed and bandwidth), however multiple processors are not required, nor necessarily germane to the novelty of the embodiments described herein. One of ordinary skill in the art would understand the many variations, modifications, and alternative embodiments that are possible.

Memory block ("memory") 220 can store one or more software programs to be executed by one or more processors (e.g., processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM), and/or applications stored in media storage that can be read into memory for execution by processing devices (e.g., processor(s) 210). Software can be implemented as a single program or a collection of separate programs and can be stored in non-volatile storage and copied in whole or in-part to volatile working memory during program execution. In some embodiments, memory 220 may store data corresponding to inputs on the computer peripheral device, such as a detected movement of the computer peripheral device, a sensor (e.g., optical sensor, accelerometer, etc.), activation of one or more input elements (e.g., smart key structures, buttons, sliders, touch-sensitive regions, etc.), or the like. Stored data may be aggregated and sent via reports to a host computing device.

In certain embodiments, memory 220 can store the various data described throughout this disclosure. Memory 220 can be used to store any suitable data to perform any function described herein and as would be appreciated by one of ordinary skill in the art with the benefit of this disclosure. Memory 220 can be referred to as a storage system or storage subsystem and can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled switches, etc.) as described herein.

Power management system 230 can be configured to manage power distribution, recharging, power efficiency, and the like. In some embodiments, power management system 230 can include a battery (not shown), a Universal Serial Bus (USB)-based recharging system for the battery (not shown), and power management devices (e.g., voltage regulators—not shown), and a power grid within system 200 to provide power to each subsystem (e.g., communications block 240, etc.). In certain embodiments, the functions provided by power management system 230 may be incorporated into processor(s) 210. Alternatively, some embodiments may not include a dedicated power management block. For example, functional aspects of power management block 240 may be subsumed by another block (e.g., processor(s) 210) or in combination therewith. The power source can be a replaceable battery, a rechargeable energy storage device (e.g., super capacitor, Lithium Polymer Battery, NiMH, NiCd), or a corded power supply. The recharging system can be an additional cable (specific for the recharging purpose), or it can use a USB connection to recharge the battery.

Communication system 240 can be configured to enable wireless communication with a corresponding host computing device (e.g., 110), or other devices and/or computer peripherals, according to certain embodiments. Communication system 240 can be configured to provide radiofrequency (RF), Near-Field Communication (NFC), Bluetooth®, Logitech proprietary communication protocol (e.g., Unifying, Bolt, Gaming Lightspeed, UWB (ultra-wideband) or others), infra-red (IR), ZigBee®, Z-Wave, or other suitable communication technology to communicate with other computing devices and/or peripheral devices. System 200 may optionally comprise a hardwired connection to the corresponding host computing device. For example, computer peripheral device 140 can be configured to receive a USB, Fire Wire®, Thunderbolt®, or other universal-type cable to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other blocks described herein (e.g., input detection module 250, output control module 260, etc.). In some aspects, communication system 240 can send reports generated by the processor(s) 210 (e.g., HID data, streaming or aggregated data, etc.) to a host computing device. In some cases, the reports can be generated by the processor(s) only, in conjunction with the processor(s), or other entity in system 200. Communication system 240 may incorporate one or more antennas, oscillators, etc., and may operate at any suitable frequency band (e.g., 2.4 GHZ), etc. One of ordinary skill in the art with the benefit of this disclosure would appreciate the many modifications, variations, and alternative embodiments thereof.

Input detection module 250 can control the detection of a user-interaction with input elements on an input device. For instance, input detection module 250 can detect user inputs from motion sensors, keys (e.g., smart key structures, conventional keys), or buttons (e.g., depressible elements), roller wheels, scroll wheels, track balls, touch pads (e.g., one and/or two-dimensional touch sensitive touch pads), click wheels, dials, keypads, microphones, GUIs, touch-sensitive GUIs, proximity sensors (e.g., IR, thermal, Hall effect, inductive sensing, etc.), an image sensor based detection such as gesture detection (e.g., via webcam), audio based detection such as voice input (e.g., via microphone), or the like, as would be appreciated by one of ordinary skill in the art with the benefit of this disclosure. Alternatively, the functions of input detection module 250 or subset thereof can be subsumed by processor 210, or in combination therewith.

In some embodiments, input detection module 250 can detect a touch or touch gesture on one or more touch sensitive surfaces on keyboard 140. Input detection block 250 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of computer peripheral device 140 may or may not utilize touch detection or touch sensing capabilities.

Input detection block 250 can include touch and/or proximity sensing capabilities. Some examples of the types of touch/proximity sensors may include, but are not limited to, resistive sensors (e.g., air-gap 4-wire based, based on carbon loaded plastics which have different electrical characteristics depending on the pressure (FSR), interpolated FSR, strain gages, etc.), capacitive sensors (e.g., surface capacitance, self-capacitance, mutual capacitance, etc.), optical sensors (e.g., light barrier type (default open or closed), infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, etc.), inductive sensors, magnetic sensors (e.g., Hall Effect, etc.), or the like.

Input detection module 250 may include a movement tracking sub-block that can be configured to detect a relative displacement (movement tracking) of a computer peripheral device. For example, input detection module 250 optical sensor(s) such as IR LEDs and an imaging array of photo-diodes to detect a movement of a computer peripheral device relative to an underlying surface. A computer peripheral device may optionally include movement tracking hardware that utilizes coherent (laser) light. Moving tracking can provide positional data (e.g., delta X and delta Y data from last sampling) or lift detection data. For example, an optical sensor can detect when a user lifts the computer peripheral device (e.g., computer mouse 130) off of an underlying surface (also referred to as a "work surface") and can send that data to processor 210 for further processing. In some embodiments, processor 210, the movement tracking block (which may include an additional dedicated processor), or a combination thereof, as would be appreciated by one of ordinary skill in the art with the benefit of this disclosure.

In certain embodiments, accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three-dimensional (3D) positioning. For example, 3D tracking can utilize a three-axis accelerometer or two two-axis accelerometers (e.g., in a "3D air mouse," HMD, or another device). Accelerometers can further determine if the computer peripheral device has been lifted off of an underlying surface and can provide movement data that may include the velocity, physical orientation, and acceleration of a computer peripheral device. In some embodiments, gyroscope(s) can be used in lieu of or in conjunction with accelerometer(s) to determine movement or input device orientation.

In some embodiments, output control module 260 can control various outputs for a corresponding computer peripheral device. For instance, output control module 260 may control a number of visual output elements (e.g., LEDs, LCD or LED screens/keys), displays, audio outputs (e.g., speakers), haptic output systems, or the like. One of ordinary skill in the art with the benefit of this disclosure would appreciate the many modifications, variations, and alternative embodiments thereof.

Although certain systems may not be expressly discussed, they should be considered as part of system 200, as would be understood by one of ordinary skill in the art. For example, system 200 may include a bus system to transfer power and/or data to and from the different systems therein. It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices (e.g., computer peripheral devices) implemented using any combination of circuitry and software. Furthermore, aspects and/or portions of system 200 may be combined with or operated by other sub-systems as required by design. For example, input detection module 250 and/or memory 220 may operate within processor(s) 210 instead of functioning as separate entities. In addition, the inventive concepts described herein can also be applied to any electronic device. Further, system 200 can be applied to any of the computer peripheral devices described in the embodiments herein, whether explicitly, referentially, or tacitly described (e.g., would have been known to be applicable to a particular computer peripheral device by one of ordinary skill in the art). The foregoing embodiments are not intended to be limiting and those of ordinary skill in the art with the benefit of this disclosure would appreciate the myriad applications and possibilities.

Figure 3:
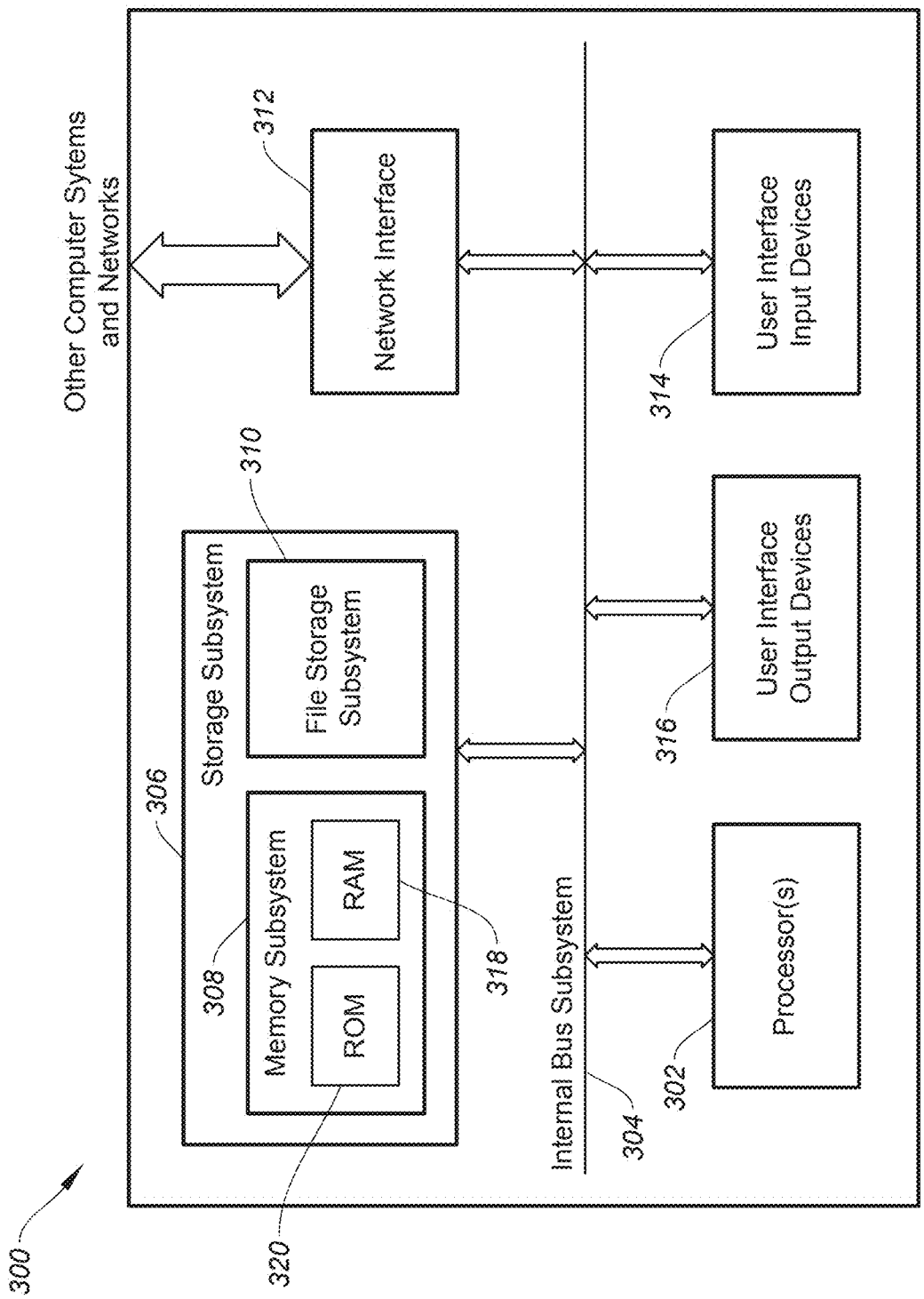
FIG. 3 is a simplified block diagram of a host computing device, according to certain embodiments.

FIG. 3 is a simplified block diagram of a host computing device ("host computer") 300, according to certain embodiments. Host computing device 300 can implement some or all functions, behaviors, and/or capabilities described herein that would use electronic storage or processing, as well as other functions, behaviors, or capabilities not expressly described. Host computing device 300 can include a processing subsystem (processor(s)) 302, a storage subsystem 306, user interfaces 314, 316, and a communication interface 312. Computing device 300 can also include other components (not explicitly shown) such as a battery, power controllers, and other components operable to provide various enhanced capabilities. In various embodiments, host computing device 300 can be implemented in any suitable computing device, such as a desktop or laptop computer (e.g., desktop 110), mobile device (e.g., tablet computer, smart phone, mobile phone), wearable device, media device, or the like, or in peripheral devices (e.g., keyboards, etc.) in certain implementations.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function, portions of functions, or a combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine-readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention (e.g., surface classification) may be performed by software stored in storage subsystem 306, stored in memory 220 of a computer peripheral device, or both. One of ordinary skill in the art with the benefit of this disclosure would appreciate the many modifications, variations, and alternative embodiments thereof.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a host computing device 110 to perform corresponding actions. The instructions may be configured to run in sequential order, in parallel (such as under different processing threads), or in a combination thereof. After loading a code module on a general-purpose computer system, the general-purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using the communication interface 312.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE, 5G; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., computer mouse, keyboard, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), haptic devices, etc. Note that user interface input and output devices are shown to be a part of system 300 as an integrated system. In some cases, such as in laptop computers, this may be the case as keyboards and input elements as well as a display and output elements are integrated on the same host computing device. In some cases, the input and output devices may be separate from system 300, as shown in FIG. 1. One of ordinary skill in the art with the benefit of this disclosure would appreciate the many modifications, variations, and alternative embodiments thereof.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Host computing devices, wireless transceivers (e.g., USB devices), or even peripheral devices described herein can be implemented using system 300.

Latency and Jitter

In many cases, imperfections in a mouse cursor movement on a display (or in a gaming environment controlled by a computer mouse) can often be perceived by human users. These imperfections typically fall into two categories including latency and jitter. Latency (e.g., for a computer mouse 130) can include the time delay between the movement of the computer mouse in the physical world (e.g., on a work surface) and the moment its effect is be displayed on a corresponding display screen. Jitter (e.g., for a computer mouse 130) can include the uniformity of the mouse displacement displayed on the monitor screen relative to the displacement of the computer mouse in the physical world. For instance, when the computer mouse is moving at constant speed along a work surface, the velocity displayed on the screen may be inconsistent (e.g., not constant) due to the jitter. Some root causes of jitter in computer mice are further described below.

Figure 4:
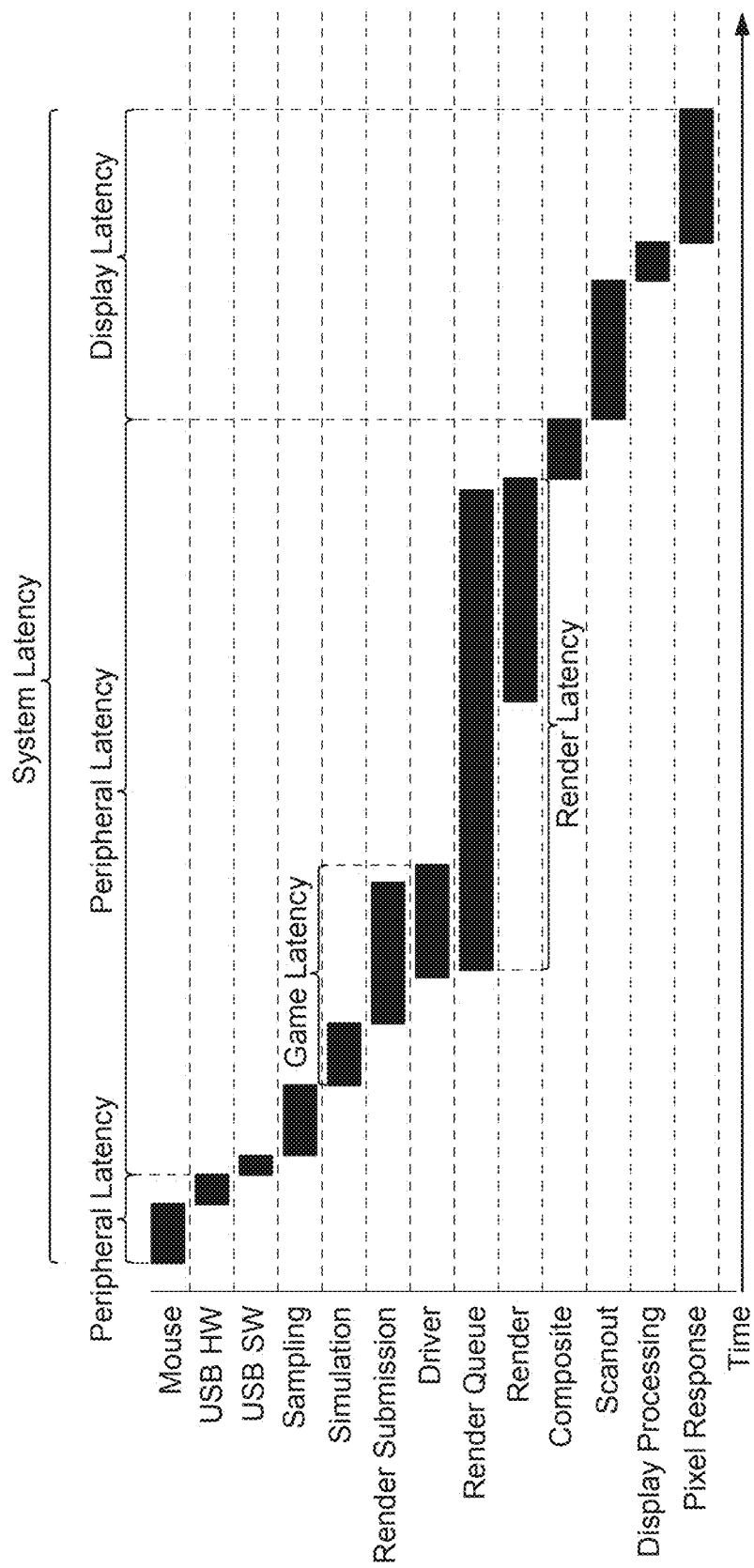
FIG. 4 is a graph that shows an example of system latency for a typical high end computing system.

In gaming, latency is an important performance metric. Contemporary gaming computer mice typically have an optical sensor-to-host computer latency of 1.5-3.0 ms or less, which can include latency of the computer mouse receiver to wireless receiver (e.g., USB transceiver) communication. This delay is relatively small compared to the overall system latency, which further includes the game latency and the display latency. In typical contemporary high end gaming personal computers (PCs), system latency can typically be between 15.0 ms-30.0 ms. Thus, computer mouse latency, in and of itself, contributes to approximately 10% of the overall system latency. FIG. 4 is a graph that shows an example of system latency for a typical high end system 100. It is plainly evident that PC latency 420 (e.g., game latency 422 and render latency 424) and display latency 430 make up a significant majority of the overall system latency, while peripheral latency 410 (e.g., mouse, USB hardware, USB software/firmware) represents a small relative fraction thereof. In some cases, an optical sensor (not shown) may contribute some jitter to the overall system jitter.

Aspects of the present disclosure are directed to innovative concepts that can reduce the contribution of the mouse latency to zero. According to academic research papers or experts in the field of gaming and VR, the minimum human perceptible visual latency is about 10-20 ms. As described above, mouse jitter can be perceived as un-smooth mouse cursor trajectory increments on the display screen. Mouse jitter can be caused by the optical mouse sensor itself when it changes its internal measurement frequency, by the mouse firmware that needs to manage multiple tasks in parallel, or by the radio communication layer of wireless mice or USB communication layer. A primary contributor of the perceptible mouse jitter typically comes from a beat effect caused by the mouse polling rate (report rate)—the rate at which mouse incremental displacements are sent to the computer host—is at a different frequency than the display screen refresh rate (also referred to as a "display frequency value").

To illustrate this phenomenon, a gaming mouse with a report rate of 1 kHz can report incremental displacement (along with button presses, etc.) every 1.0 ms, and a screen display with a refresh rate ("display frequency value") of 120 Hz displays a new image (frame) every 8.333 ms. The time to display three consecutive screen images on the display would take 25 ms. During this time, 25 mouse reports would have been sent to the host computer.

TABLE I.

NUMBER OF REPORTS INTEGRATED PER FRAME

| Display Frame | Delay From 1st Mouse Report | Mouse Motion Reports |
|---|---|---|
| Frame 1 | 8.333 ms | 8 |
| Frame 2 | 16.667 ms | 8 |
| Frame 3 | 25.000 ms | 9 |
| Frame 4 | 33.333 ms | 8 |
| Frame 5 | 41.667 ms | 8 |
| Frame 6 | 50.000 ms | 9 |

Figure 5:
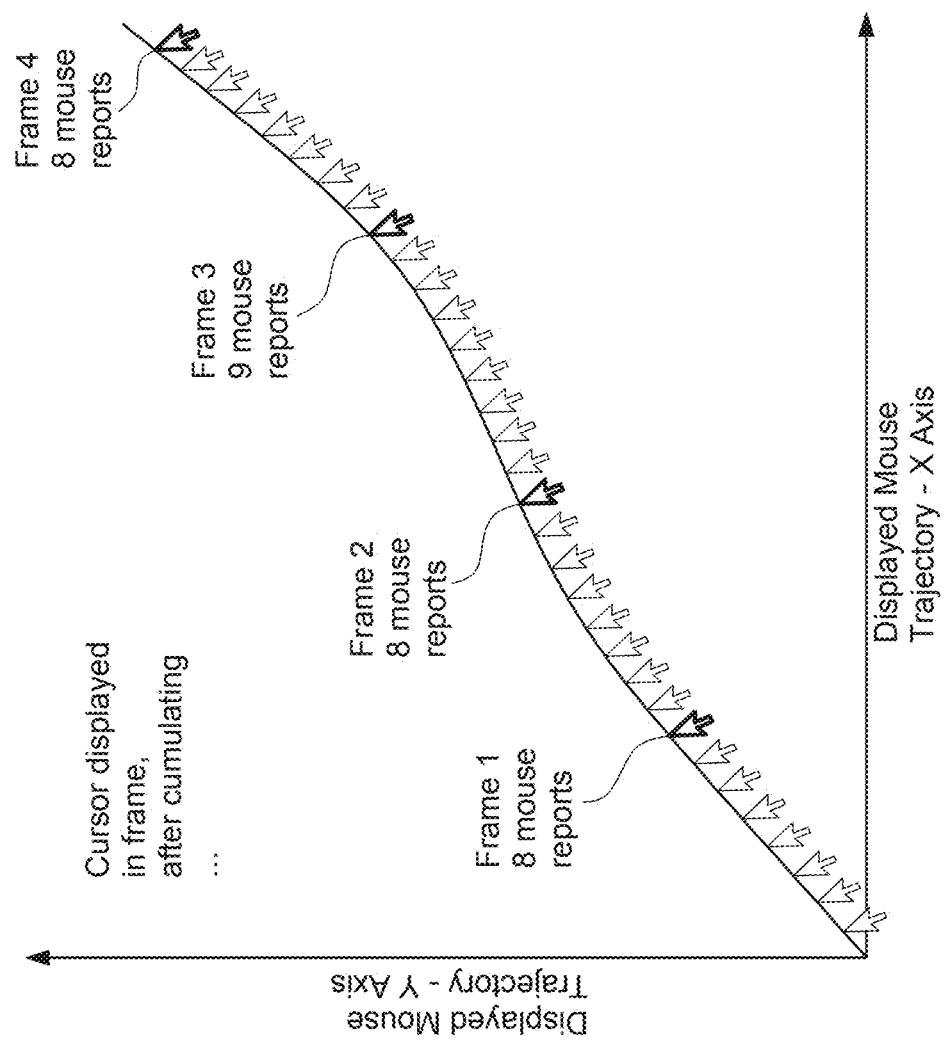
FIG. 5 is a graph showing the effects of jitter on a two-dimensional mouse trajectory over an XY plane over time.

In Table I, the first column lists each consecutive display frame, the second column shows the delay from the first mouse report due to the refresh rate of the display, and the third column shows the number of mouse motion reports. For example, if the gaming mouse is moving at a constant speed of 1 pixel (or dot) per millisecond (e.g., a gaming mouse configured at 800 DPI (dots per inch) resolution and moving at 1.25 IPS (inch per second)), the value of the third column would represent the pixels reported (integrated per frame), which is the cumulative sum of incremental mouse motion reports. Referring to Table I, 25 mouse reports would be used to display the mouse cursor on the screen after three consecutive display frames. Thus, if the computer mouse is moving at a constant speed of one pixel per millisecond, the first and second frames will display a motion of eight pixels and the third frame will display a motion of nine pixels, or an 11.5% increase in speed over the previous two frames. This velocity jitter can be perceived by users. FIG. 5A is a graph 500 showing the effects of jitter on a two-dimensional mouse trajectory over an XY plane over time for a USB. In this example, a computer mouse with a report rate of 1 kHz is reporting incremental displacements every millisecond. The motion of the computer mouse is displayed on the monitor screen with a refresh rate of 120 Hz. As described above, the cursor at frame three has nine reports instead of eight. This inconsistency (jitter) may be visually detectable by a user. In a more general sense, research has shown that mouse cursor jitter due to asynchronicity between a mouse polling rate and display refresh rate down to 500 µs can be perceived by sensitive users, and especially gamers. Aspects of the invention, as further described below, present how the mouse polling rate can be set to an integer multiple of the display refresh rate to mitigate or eliminate jitter due to this asynchronicity beat effect. By way of example, contemporary refresh rates for gaming monitors can typically be 500 Hz (2.00 ms), 360 Hz (2.78 ms), 240 Hz (4.17 ms), 120 Hz (8.33 ms), or standard at 144-165 Hz (6.1-6.9 ms). In effect, a 1 kHz mouse movement may be displayed back to the user at a 3× to 7× slower speed than the mouse movement reports, causing the display monitor to operate as a low pass filter. FIG. 5B is a graph 550 showing the effects of jitter The technical solutions to the problems described above are presented herein and can operate to: (1) reduce the latency between a user hand motion and a motion received by a software application (e.g., video game) down to zero latency; (2) reduce jitter between the user hand motion and the motion received by a display screen by adapting the mouse motion report rate (mouse polling rate) to match an integer multiple of the display screen refresh rate (also applies to multiple displays (e.g., laptop screen with larger monitor) with potentially different screen resolution and screen refresh rates); (3) increase the mouse motion report rate seen at the PC USB input (e.g., USB transceiver) level at the OS, up to 8 kHz or more, or directly integrated into driver software at OS level or into game engine level (e.g., synchronized with the game engine loop), without increasing the wireless radio transmission report rate; (4) encode and compress the motion information sent from the optical mouse sensor to the software game engine or a software application (e.g., analogous to a compressing webcam image sensor data, transmitting it, and decompressing at the receiver, rather than sending a sequence of all full size webcam images); and (5) reduce the wireless mouse power consumption by sending a lower amount of encoded compressed wireless reports to the corresponding wireless receiver.

Figure 6:
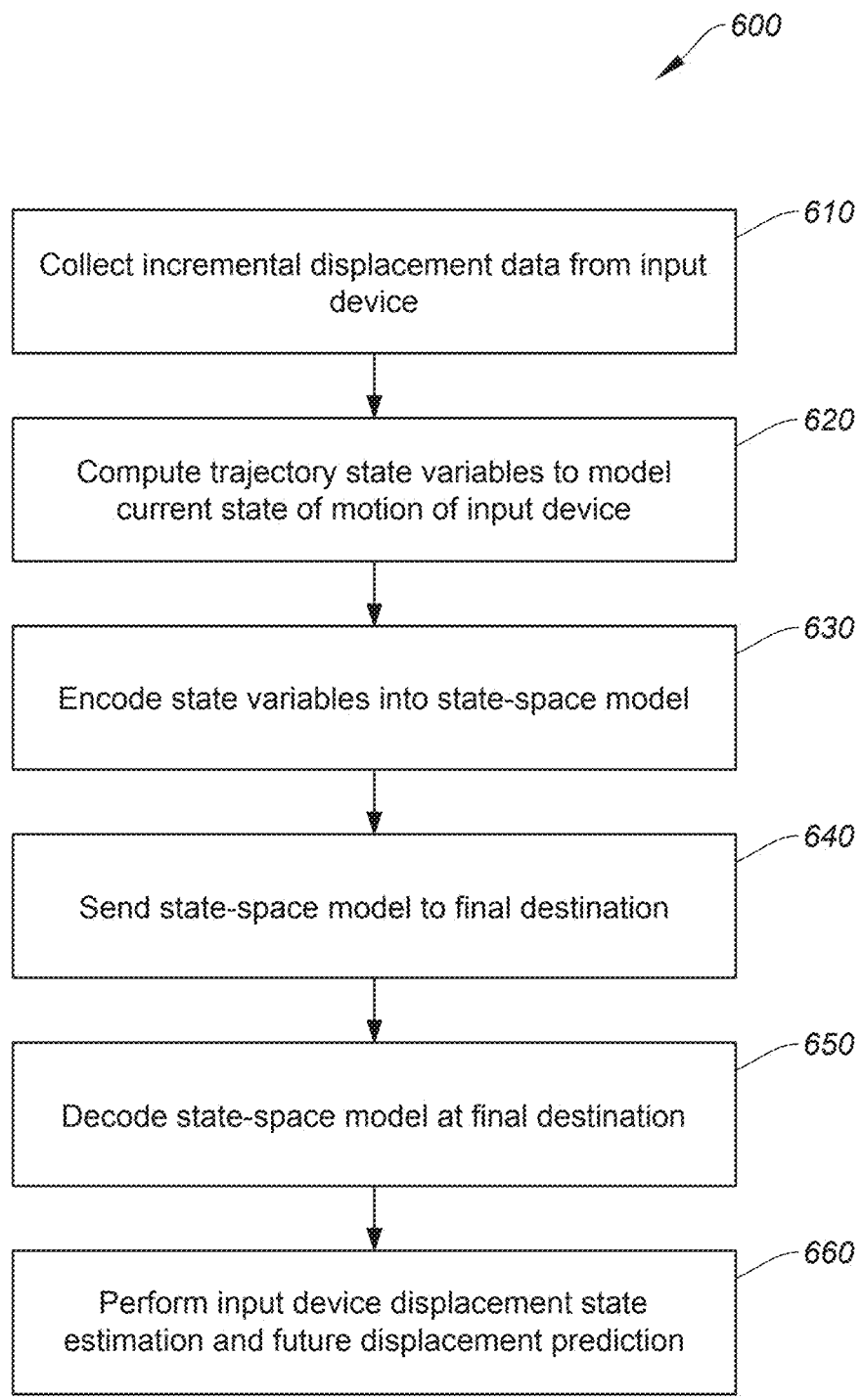
FIG. 6 is a simplified flow chart showing aspects of a method for latency reduction in a computer peripheral device, according to certain embodiments.

FIG. 6 is a simplified flow chart showing aspects of a method 600 for latency reduction in a computer peripheral device (e.g., computer mouse), according to certain embodiments. Method 600 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 600 can be performed a host computing device, a wireless transceiver (e.g., USB) coupled to the host computing device, or a combination thereof.

At operation 610, method 600 can include collecting from an optical mouse sensor, and optionally also from an IMU including a 3-axis accelerometer and a 3-axis gyroscope, incremental displacement data corresponding to Delta X ($\Delta X$) and Delta Y ($\Delta Y$) components of the mouse trajectory, according to certain embodiments.

At operation 620, method 600 can include computing trajectory state variables such as a current velocity, a current acceleration, a current jerk (e.g., first derivative of the acceleration) of the computer mouse to model the current state of the mouse motion, according to certain embodiments.

At operation 630, method 600 can include encoding these state variables into a state-space model able to describe the current state of the mouse trajectory, according to certain embodiments.

At operation 640, method 600 can include sending the state-space model to the final destination (e.g., mouse wireless receiver, software driver, game engine), according to certain embodiments.

At operation 650, method 600 can include decoding the state-space model at the final destination to sample incremental displacements $\Delta X$ and $\Delta Y$ at a frequency rate suitable for the final destination, according to certain embodiments.

At operation 660, method 600 can include performing a mouse displacement state estimation and future mouse displacement prediction by the final destination by decoding and sampling the state-space model in short future time intervals $X_{(t+1)}$, $X_{(t+2)}$, $X_{(t+3)}$, ... with $X_{(t)}$ corresponding to the current state of the trajectory (current position) and $X_{(t-1)}$, $X_{(t-2)}$, $X_{(t-3)}$, ... corresponding to past states of the trajectory, according to certain embodiments.

It should be appreciated that the specific steps illustrated in FIG. 6 provide a particular method 600 for latency reduction in a computer peripheral device, according to certain embodiments. Other sequences of steps may also be performed according to alternative embodiments. Furthermore, additional steps may be added or removed depending on the particular application. Any combination of changes can be used and one of ordinary skill in the art with the benefit of this disclosure would understand the many variations, modifications, and alternative embodiments thereof.

Such embodiments present many advantages and technical solutions to the problem of latency and jitter described above. For instance, some advantages include: (1) mouse motion state model reports sent between the mouse and the wireless USB receiver can be sent at a lower rate to reduce the wireless mouse power consumption; (2) the mouse receiver microcontroller can provide enough mathematical computation to decode and sample the mouse motion state model with no additional cost; (3) the motion state estimator running in the mouse receiver or in the software driver can estimate the mouse motion and report displacement at a rate faster than 1 ms rate (1 KHZ) (e.g., 125 µs (8 kHz)); (4) the mouse jitter due the report rate timing fluctuation can be highly reduced since the state-space model is sampled at the final destination at a constant frequency; (5) the mouse jitter due the asynchronicity between the mouse polling rate and the screen display refresh rate can be removed by dynamically setting the state-space model decoding sampling rate to a multiple of the current display refresh rate, which can be defined depending on the use case: current refresh rate of a monitor display, refresh rate of the monitor screen where the mouse cursor is currently displayed in a multi-screen situation, and current frame per seconds (FPS) of a game; and (6) in multi-screen scenarios, in addition to adapting the mouse polling rate dynamically to the monitor refresh rate, the mouse cursor displayed velocity can be fine-tuned to compensate for different pixel density (dot per inch (DPI) or pixels per inch (PPI)) of the different DPI aware monitor screens. In such cases, the mouse driver software (e.g., Logitech Options+®, Logitech G Hub®, Logitech Tune®, or the like) would interrogate and store each monitor screen pixel density values of the setup. When the mouse is being used, the mouse driver software can interrogate the OS about on which monitor screen the mouse cursor is currently being displayed, and rescale the displacement at the motion state model level to compensate for different screen pixel densities. When switching from one screen to another at a certain velocity of the mouse motion, a user would then perceive a correct match of the motion velocity of the cursor displayed on the screen.

Figure 7:
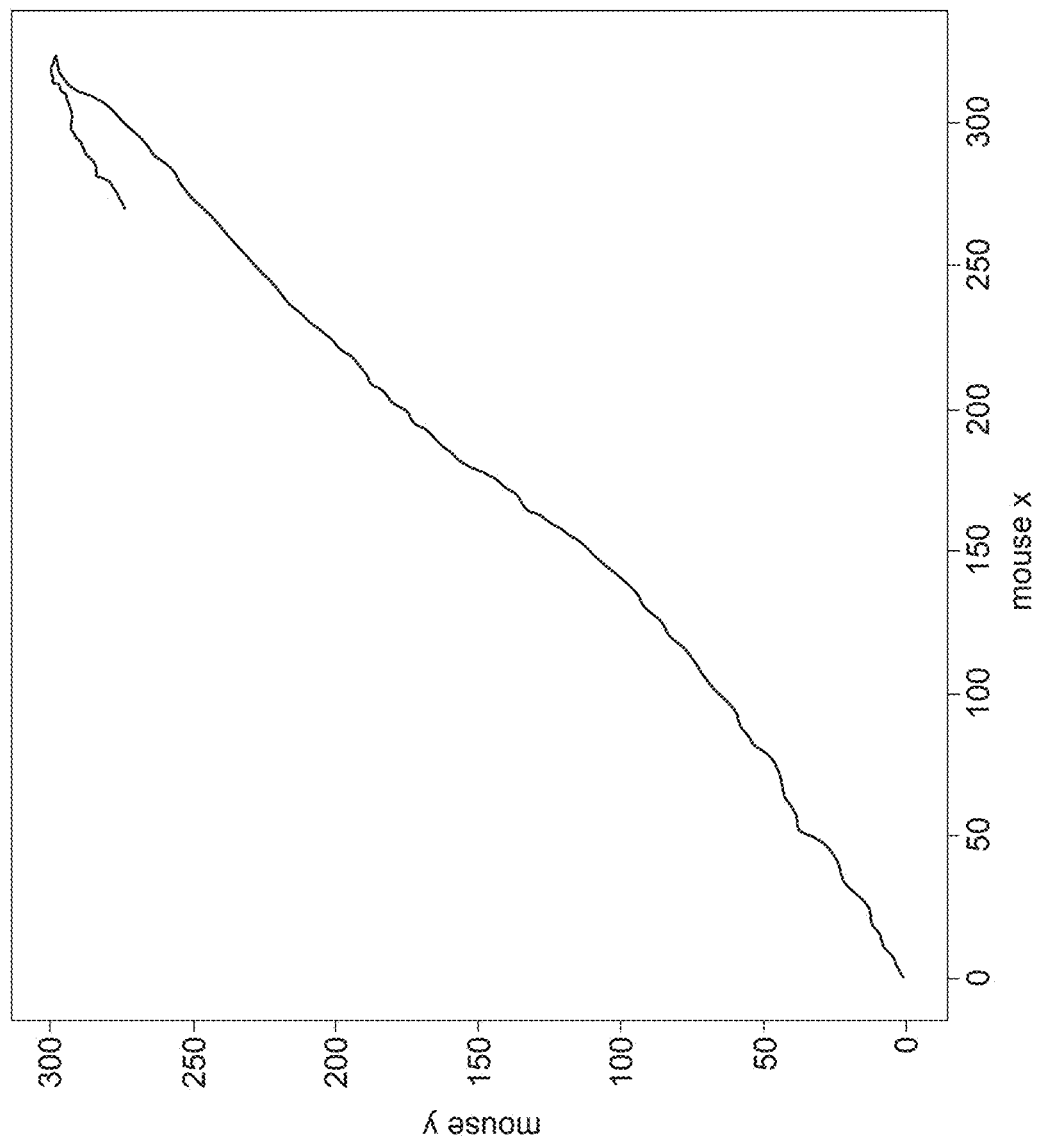
FIG. 7 shows an example of a computer mouse trajectory, according to certain embodiments.
Figure 8:
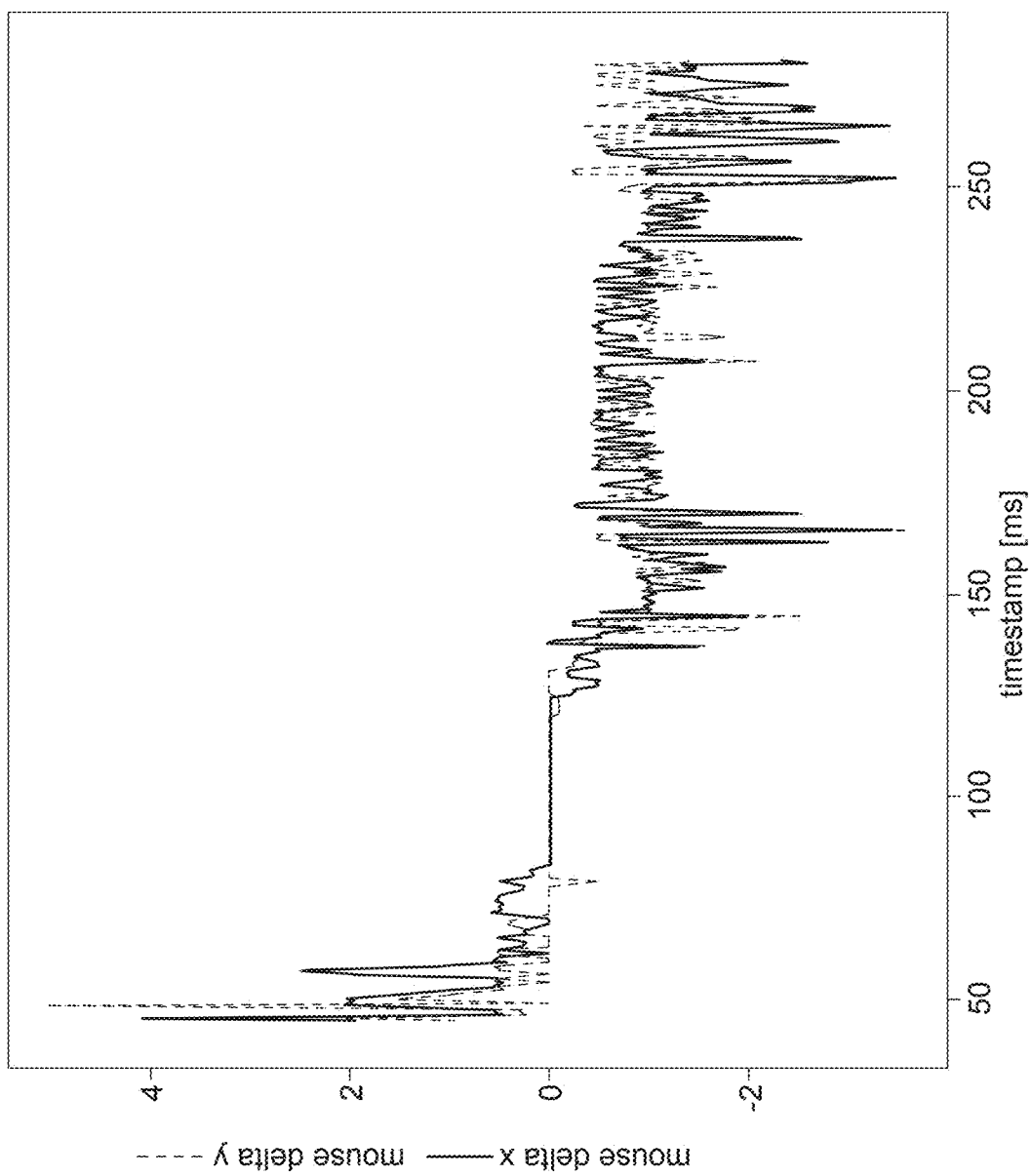
FIG. 8 shows incremental displacements $\Delta X$ and $\Delta Y$ corresponding to mouse trajectory, according to certain embodiments.
Figure 9A:
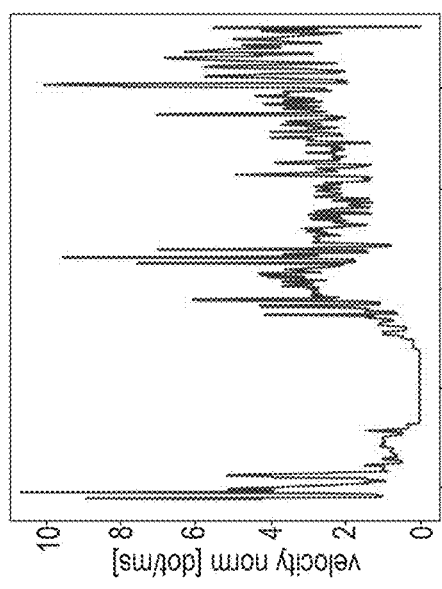
FIG. 9A-9F show six estimated velocity and acceleration plots corresponding to mouse trajectory, according to certain embodiments.
Figure 9B:
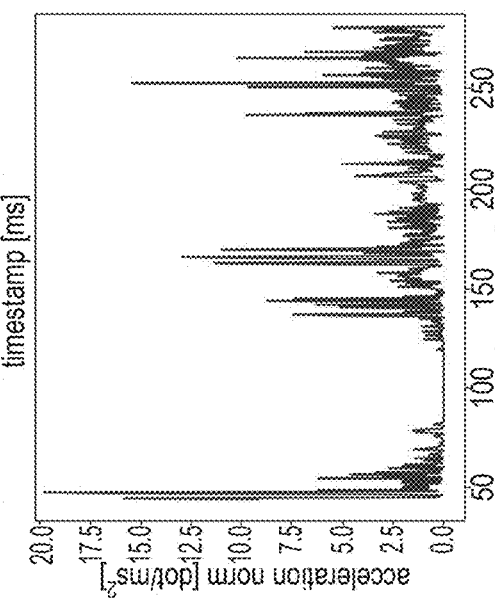
Figure 9C:
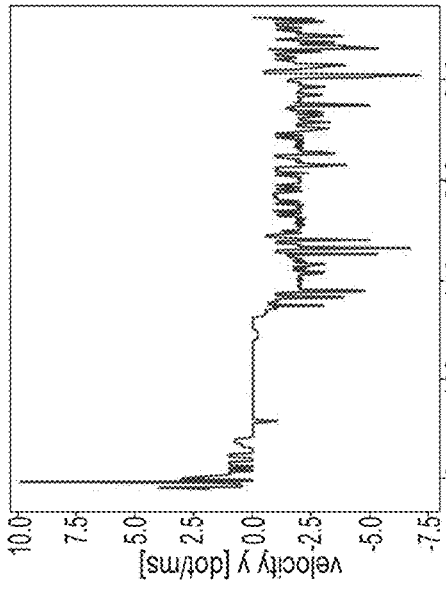
Figure 9D:
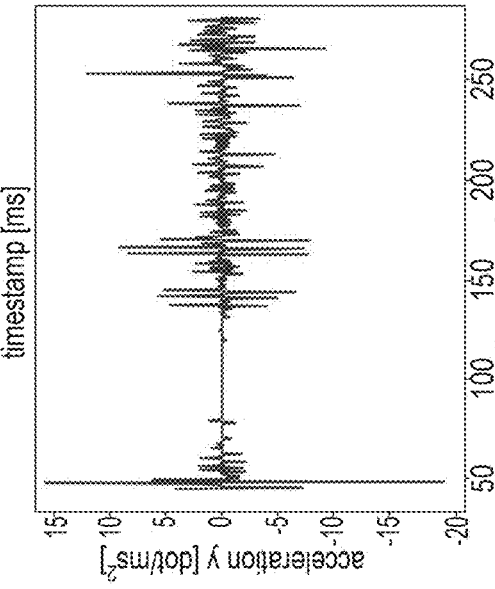
Figure 9E:
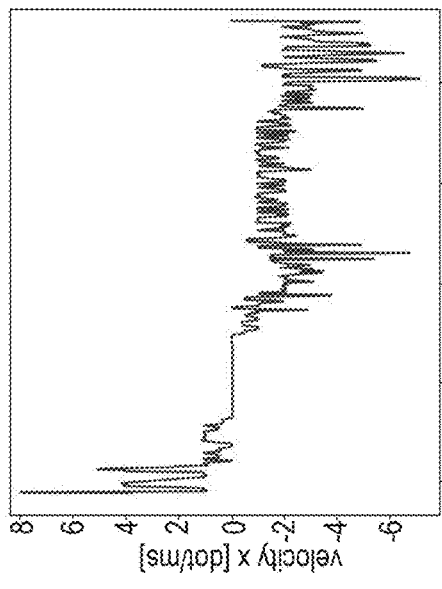
Figure 9F:
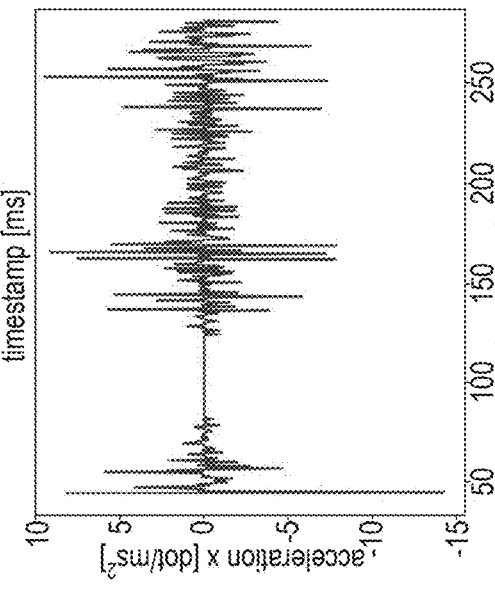
Figure 10A:
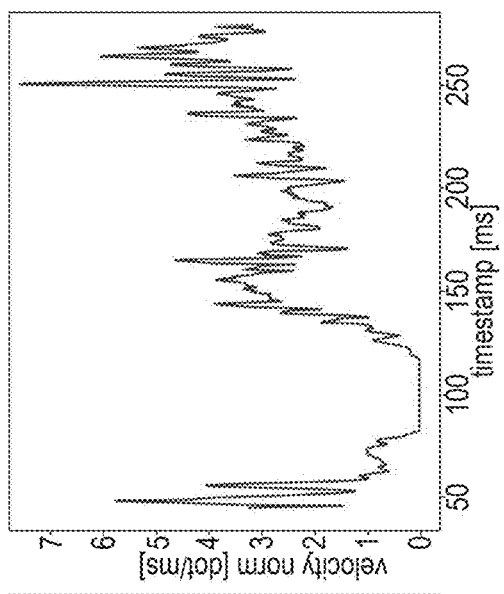
FIGS. 10A-10F show six filtered estimated velocity and acceleration plots corresponding to the mouse trajectory, according to certain embodiments.
Figure 10B:
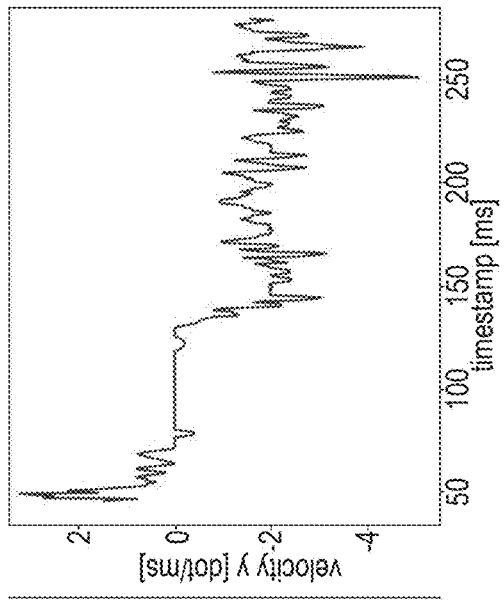
Figure 10C:
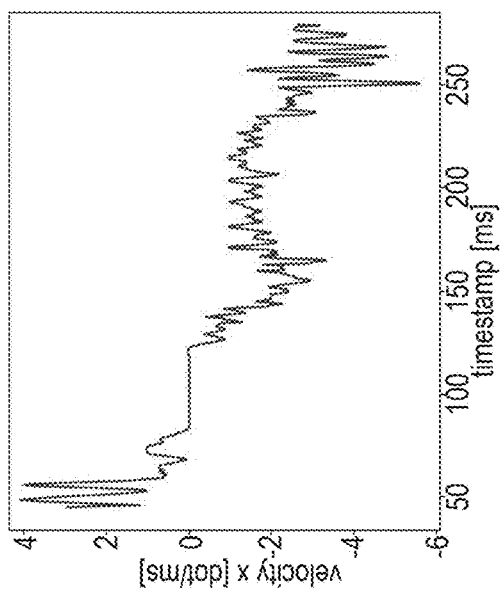
Figure 10D:
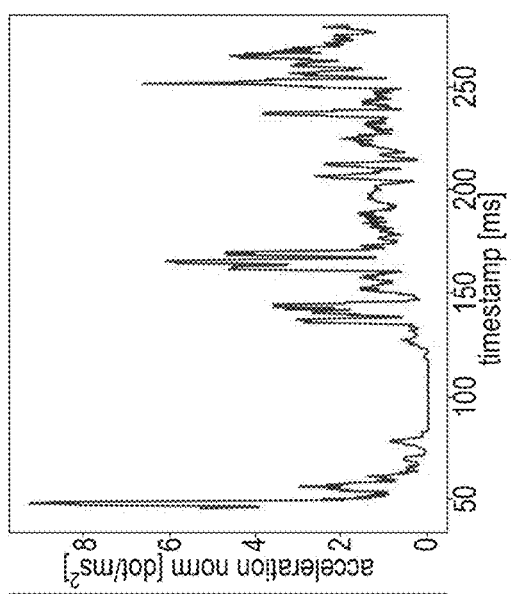
Figure 10E:
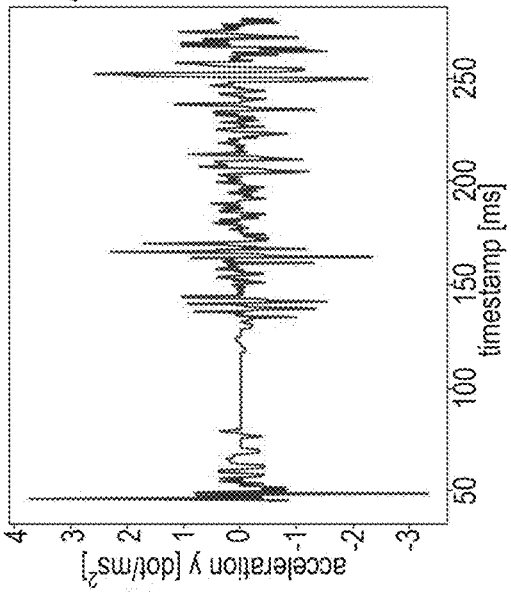
Figure 10F:
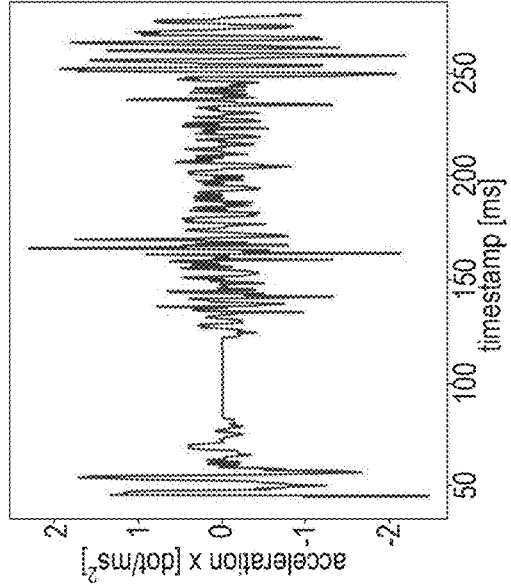
Figure 11:
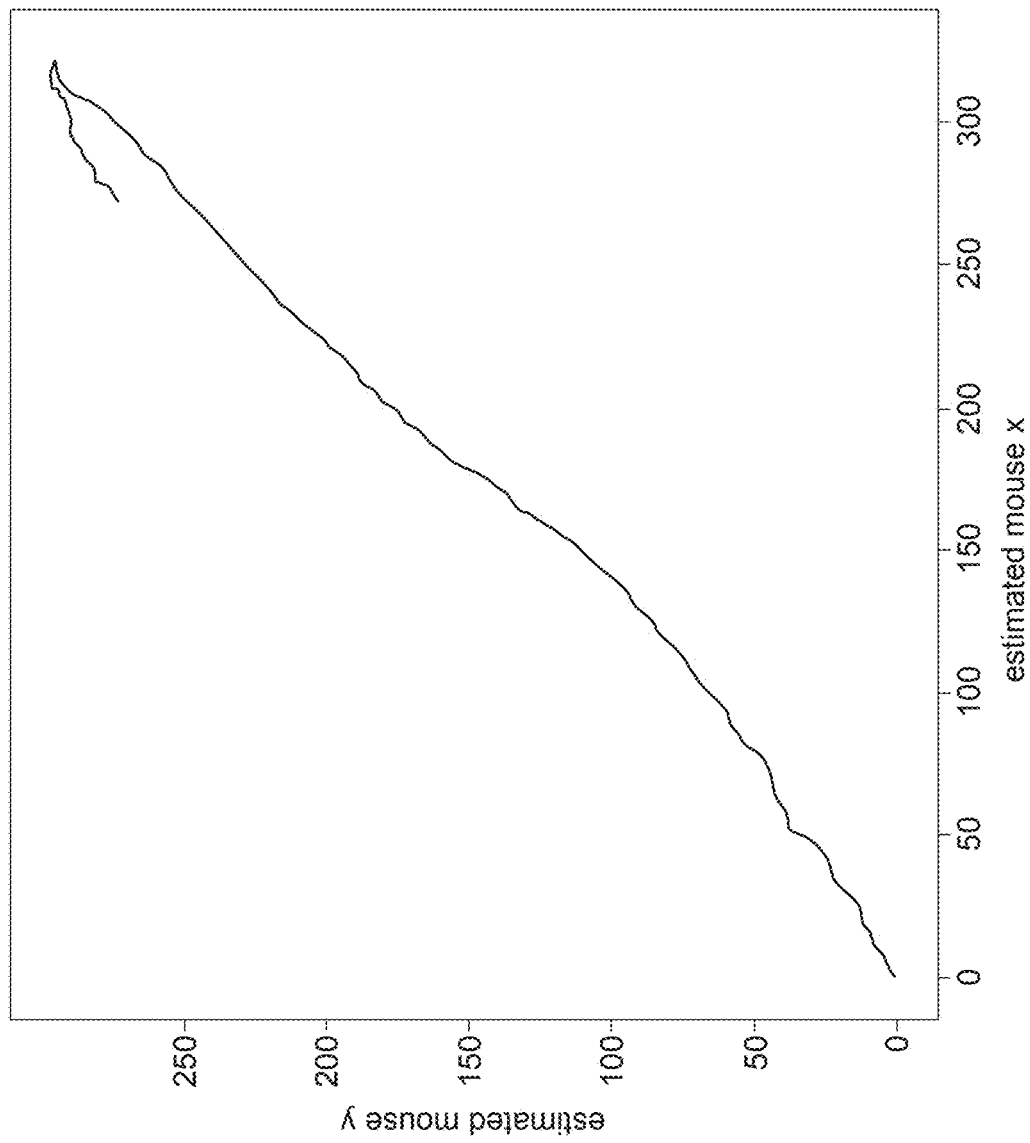
FIG. 11 shows a reconstructed mouse trajectory from the mouse motion state model, according to certain embodiments.

FIG. 7 is a plot 700 showing an example of a computer mouse trajectory 710, according to certain embodiments. Motion begins at coordinate (271, 274) and ends at coordinate (0, 0). FIG. 8 shows incremental displacements Delta X (ΔX) and Delta Y (ΔY) corresponding to mouse trajectory 710, according to certain embodiments. FIG. 9A-9F show six estimated velocity (velocity along X axis, along Y axis, and the norm of the velocity) and acceleration (acceleration along X axis, along Y axis and the norm of the acceleration) plots corresponding to mouse trajectory 710, according to certain embodiments. FIGS. 10A-10F show six filtered estimated velocity and acceleration plots corresponding to the mouse trajectory 710, according to certain embodiments. The plots are filtered with moving average window of five data points. FIG. 11 is a plot 1100 showing a reconstructed mouse trajectory 1110 from the mouse motion state model, according to certain embodiments.

Multi-Screen Scenario

Figure 12:
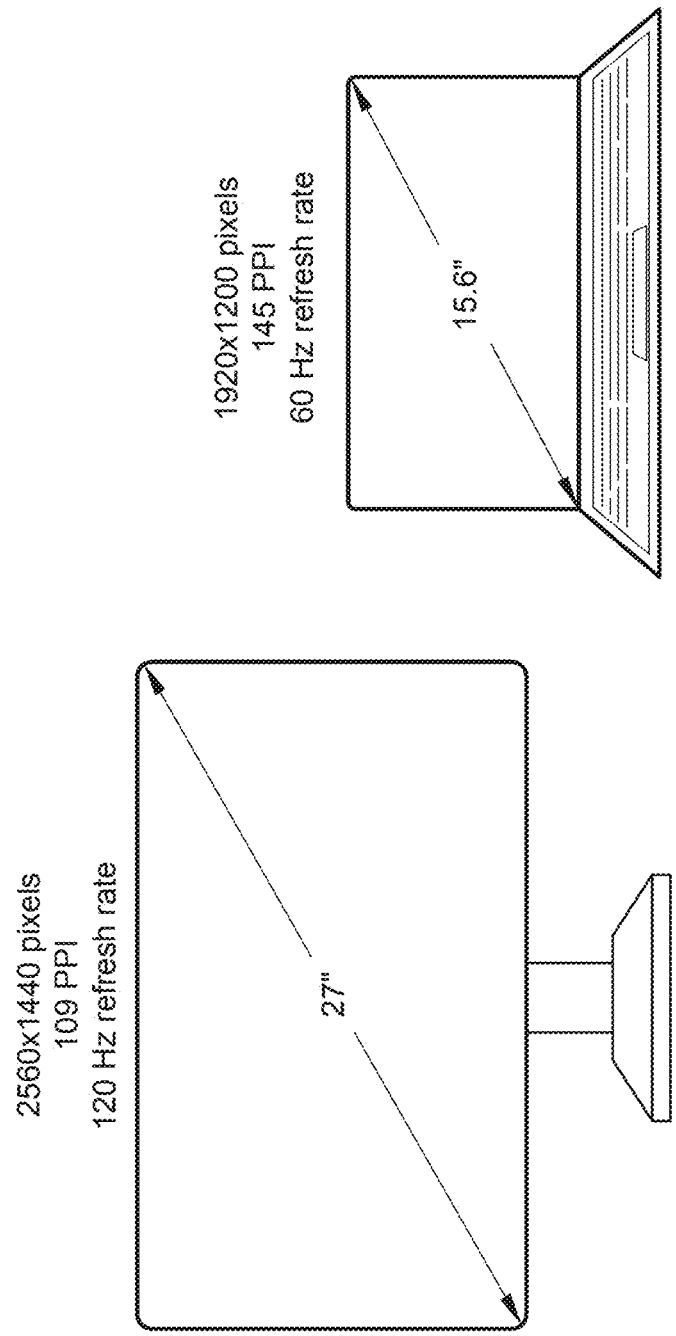
FIG. 12 shows a multi-screen setup with a laptop screen and larger external display, according to certain embodiments.

In some cases, trajectory estimation can be made complicated when presented with multi-screen scenarios. By way of example, FIG. 12 shows a multi-screen setup with a laptop screen and larger external display, according to certain embodiments. In this example, the external display is 27" with 2560×1440 pixels, 109 PPI, and a 120 Hz refresh rate. The laptop display is 15.6" with 1920×1200 pixels, 145 PPI, and a 60 Hz refresh rate. The two display exhibit different pixel densities (expressed in PPI) and different refresh rates (expressed in Hertz). The pixel density ratio between the two displays is: 145/109=1.33. Thus, for the same velocity of the mouse along a work surface, the mouse cursor on the screen will appear to be 1.33 faster on the external secondary display than the laptop display due to the pixel density difference. At the same time, the laptop display will integrate (aggregate) twice as many mouse incremental displacement reports per frame than on the external secondary display due to the differing refresh rates, leading to mouse cursor jitter caused by this beat effect. These two inconsistencies can be corrected with the present invention by decoding and sampling the mouse motion state model based on each display screen parameters, as described below and as shown in part in FIGS. 7-11.

Exemplary Embodiments

In certain embodiments, a mouse optical sensor provides ΔX and ΔY displacement intervals at 1 KHz or faster (e.g., 2 kHz, 4 kHz) to the computer mouse microcontroller (e.g., processor 210), depending on the current velocity of the mouse. A precise timestamp can be attached to each incremental displacement data. In certain embodiments, a sequence of multiple incremental displacement reports may be aggregated into the memory of the mouse microcontroller, for instance in the following manner:

ΔX$_{t-3}$ ΔY$_{t-3}$ T$_{t-3}$
ΔX$_{t-2}$ ΔY$_{t-2}$ T$_{t-2}$
ΔX$_{t-1}$ ΔY$_{t-1}$ T$_{t-1}$
ΔX$_{t0}$ ΔY$_{t0}$ T$_{t0}$ where ΔX$_t$=change in X at time t, ΔY$_t$=change in Y at time t, and T$_t$=timestamp at time t, according to certain embodiments. State variables of a mouse motion state model are computed on the mouse microcontroller, based on the incremental displacement data and the time interval of the corresponding timestamps. The current mouse velocity (e.g., average velocity between two consecutive incremental displacement data), current mouse acceleration, and current mouse jerk (a first derivative of the acceleration) are computed and stored in the memory of the mouse microcontroller.

In some cases, the current average velocity estimation can be computed as follows:

$$vx_{t-0.5} = \frac{\Delta X_{t0}}{T_{t0} - T_{t-1}}$$

$$vy_{t-0.5} = \frac{\Delta Y_{t0}}{T_{t0} - T_{t-1}}$$

$$Tv_{t-0.5} = \frac{T_{t0} + T_{t-1}}{2}$$

where vx$_t$=average velocity estimation along the X axis at time t, vy$_t$=average velocity estimation along the Y axis at time t, and Tv$_t$=timestamp of velocity state variables at time t, according to certain embodiments.

In some cases, the current average acceleration estimation can be computed as follows:

$$ax_{t-1} = \frac{vx_{t-0.5} - vx_{t-1.5}}{Tv_{t-0.5} - Tv_{t-1.5}}$$

$$ay_{t-1} = \frac{vy_{t-0.5} - vy_{t-1.5}}{Tv_{t-0.5} - Tv_{t-1.5}}$$

$$Ta_{t-1} = \frac{Tv_{t-0.5} + Tv_{t-1.5}}{2}$$

where ax$_t$=average acceleration estimation along the X axis at time t, ay$_t$=average acceleration estimation along the Y axis at time t, and Ta$_t$=timestamp of acceleration state variables at time t, according to certain embodiments.

In some embodiments, a current average jerk estimation can be computed as follows:

$$jx_{t-1.5} = \frac{ax_{t-1} - ax_{t-2}}{Ta_{t-1} - Ta_{t-2}}$$

$$jy_{t-1.5} = \frac{ax_{t-1} - ax_{t-2}}{Ta_{t-1} - Ta_{t-2}}$$

$$Tj_{t-1.5} = \frac{T_{t0} + T_{t-1}}{2}$$

where $jx_t$=average jerk estimation along the X axis at time t, $jy_t$=average jerk estimation along the Y axis at time t, and $Tj_t$=timestamp of jerk state variables at time t, according to certain embodiments.

Computing derivatives with a differencing method can introduce delay in the signal. However, since incremental displacements, velocity, acceleration, and jerk estimations are stored as time series, this delay can be compensated by time series forecasting methods such as Autoregressive-moving-average model (ARMA), Autoregressive integrated moving average (ARIMA), a Kalman filter, or deep learning RNN models in order to estimate all state variables in the same time frame. In some aspects, the state variables of a mouse motion state model can be filtered with a moving average filter, a FIR filter, or any suitable temporal filter, as would be appreciated by one of ordinary skill in the art with the benefit of this disclosure. Filtering state variables can introduce an additional delay, which can be compensated by series forecasting methods.

The state variables of a mouse motion state model can then be sent to the final destination, which may include: a USB mouse receiver of a wireless mouse; a mouse driver software (e.g., Logitech Options+, Logitech G Hub, Logitech Tune, or the like), the OS of the host computer, the game engine of a video game, a cloud application of a video conferencing application, or the like, as would be appreciated by one of ordinary skill in the art with the benefit of this disclosure. The final destination can be capable of decoding the mouse motion based on the received state variables of a mouse motion state model and sample the trajectory at a suitable frequency and estimate the current incremental displacement of the mouse. In some aspects, the computer mouse may not report a position in an absolute coordinate system, but rather reports incremental displacement, similar to a velocity sensor.

To sample the trajectory from the mouse motion state model, the average velocity can be computed during the next or few next incremental samples as follows:

$$vx_{t+0.5} = vx_{t0} + \frac{1}{2}ax_{t0}\Delta t + \frac{1}{8}jx_{t0}\Delta t^2$$

$$vy_{t+0.5} = vy_{t0} + \frac{1}{2}ay_{t0}\Delta t + \frac{1}{8}jy_{t0}\Delta t^2$$

using $\Delta t = 0.5$ as time increment

Using the average velocity to compute the incremental displacement can result as:

$$\Delta X_{t+1} = vx_{t+0.5}\Delta t = vx_{t0}\Delta t + \frac{1}{2}ax_{t0}\Delta t^2 + \frac{1}{8}jx_{t0}\Delta t^3$$

using $\Delta t = 1$ as time increment $$\Delta Y_{t+1} = vy_{t+0.5}\Delta t = vy_{t0}\Delta t + \frac{1}{2}ay_{t0}\Delta t^2 + \frac{1}{8}jy_{t0}\Delta t^3$$

An improved sampling model can be defined as:

$$\Delta X_{t+1} = \alpha vx_{t0}\Delta t + \beta ax_{t0}\Delta t^2 + \gamma jx_{t0}\Delta t^3$$

$$\Delta Y_{t+1} = \alpha vy_{t0}\Delta t + \beta ay_{t0}\Delta t^2 + \gamma jy_{t0}\Delta t^3$$

where $\alpha$, $\beta$, $\gamma$ are parameters that can be estimated by comparing the ground truth trajectory measured with the optical mouse sensor with the decoded and forecasted sampled trajectory estimated from the mouse motion state model, and optimizing for reducing the difference between these two trajectories. In some cases, $\alpha$ being typically close to 1.0, $\beta$ ranging typically between 0.2 and 0.8, and $\gamma$ ranging typically between 0.1 and 0.3.

In some implementations, the choice of the motion state model sampling rate (MSMSR) can be dependent on the application. For example, for gaming applications, the MSMSR can be high (e.g., 8 kHz) if the final destination is a USB mouse receiver of a wireless mouse. The MSMSR can be dynamically adjusted to match the current rendering rate of a video game (e.g., current frame per second of a video game) if the final destination is a gaming mouse driver software (e.g., G HUB) or directly the video game engine itself. The MSMSR can be dynamically adjusted to match a multiple of the current monitor screen refresh rate, where the current monitor screen corresponds to the one on which the mouse cursor is currently displayed.

In addition to the current incremental displacement of the mouse, the final destination is capable of decoding and sampling the mouse motion to estimate several future incremental displacements along a predicted mouse trajectory in order to compensate for the mouse latency, typically in the order of ~ 1.0 ms to 3.0 ms. When a new incremental displacement data report is received from the optical mouse sensor by the mouse microcontroller, the state variables of the mouse motion state model may be updated. The mouse microcontroller can also decode and sample the mouse motion state model to estimate the trajectory and compare it with the new incremental displacement data report to estimate the current error in the mouse motion state model and compensate for it.

In further embodiments, the mouse motion state model encoding the mouse trajectory, running in the mouse, is based on a linear state estimator (LSE).

In some embodiments, the mouse motion state model encoding the mouse trajectory, running in the mouse, is based on an extended Kalman filter (EKF).

In certain embodiments, the mouse motion state model encoding the mouse trajectory is running in the wireless USB receiver instead of in the mouse. In such cases, the wireless mouse microcontroller can send the incremental displacement data of radio communication to the USB receiver as in a standard computer mouse application. The USB receiver can encode the trajectory with the mouse motion state model and sends it to the final destination. The final destination can include: (1) the USB mouse receiver of a wireless mouse (e.g., the motion state model encoding enables resampling the mouse motion at the desired sampling rate); (2) the mouse driver software (e.g., Logitech Options+, Logitech G Hub, Logitech Tune, or the like); (3) the OS of the host computer; (4) a game engine of a software application (e.g., video game); (5) a cloud application (e.g., video conferencing application); or the like, as would be appreciated by one of ordinary skill in the art with the benefit of this disclosure.

In further embodiments, the mouse motion state model, encoding the mouse trajectory, can be capable of predicting both future motion state in time domain and interpolate sub-pixel displacement in spatial domain. For instance, a software application programming interface (API) running on the host computer is provided by the mouse driver software and is used to interface with games and software applications.

In some embodiments, the mouse motion state model, encoding the mouse trajectory, includes estimating the current mouse velocity and mouse acceleration.

In certain embodiments, the mouse motion state model, encoding the mouse trajectory, in addition to the velocity, the acceleration, also includes estimating the current mouse jerk.

In some embodiments, the mouse motion state model, encoding the mouse trajectory, in addition to the velocity, the acceleration and the jerk, is also containing additional derivatives, such as snap, crackle, pop. Snap, or jounce, is the fourth derivative of the position vector with respect to time, or the rate of change of the jerk with respect to time. Crackle is a fifth derivative of the position vector with respect to time, and is the rate of change of snap with respect to time. Pop is the sixth derivative of the position vector with respect to time, and is the rate of change of crackle with respect to time.

In certain embodiments, the mouse motion state model, encoding the mouse trajectory, is sampled in a way to compensate for different parameters of multi-screen displays, among which these parameters are the display screen pixel density and the display screen refresh rate.

In some embodiments, in addition to the optical mouse sensor, an accelerometer (e.g., 3-axis) and/or an IMU and/or a 3-axis gyroscope placed inside the mouse, near the optical mouse sensor, can be used to measure the acceleration and/or compute the jerk value.

Synchronizing Input Device Report Rate and Display Refresh Rate

Aspects of the invention relate to systems and methods that can synchronize the frequency of an input device (e.g., computer mouse 130) polling rate with the refresh rate of a display device (e.g., computer monitor 120) to reduce a perceived motion jitter (e.g., motion of a cursor controlled by the input device and displayed on the display device). Contemporary office (productivity) computer mice typically report motion data at a frequency of 125 Hz (every 8 ms). Some typical contemporary gaming mice typically report motion data at a frequency of 1 kHz (every 1 ms). Gaming display monitors typically refresh the displayed image at a frequency of 120 Hz (every 8.333 ms), 240 Hz (4.167 ms), 360 Hz (2.778 ms), and 500 Hz (2.000 ms) at the high end, although other refresh rates are possible. When mouse motion reports are sent to a computer at a frequency that is not a multiple of the display refresh rate, motion jitter will occur. Some display frames will accumulate more mouse reports than others, leading to a non-uniform velocity of the motion controlled by the mouse (e.g., mouse cursor, target, 3D environment in an FPS game, or the like). This phenomenon has similarities similar to wave interference in physics or a beat effect in acoustics. Aspects of the invention are directed to adapting the input device polling rate to match the display monitor refresh rate frequency by setting the mouse polling rate to be an integer multiple of the display monitor refresh rate frequency.

To provide a simplified overview of this process (further described throughout the present disclosure), the frame rate (refresh rate) of a monitor(s) (display) is requested. This can be performed by the OS, by a software application controlling software (e.g., Logitech Options+, Logitech Tune, or the like), a host computer-side USB transceiver, or the like. If, for instance, the frame rate is 240 Hz, then an input device (e.g., computer mouse) communicatively coupled to the host computing device receives the frame rate information and can adjust its report rate to match the frame rate, or a multiple thereof to eliminate or reduce this beat effect. For example, some faster contemporary computer mice report at around 1 kHz. The computer mice can slow the report rate to 960 Hz (4× multiple of 240 Hz), which will be a negligible change in speed that would not typically be detectable by a human, but would significantly reduce or eliminate jitter related to the previous beat effect. This can be done when using multiple displays by adjusting the report rate corresponding to a screen that a mouse cursor, graphic, etc., is being controlled on.

Figure 13:
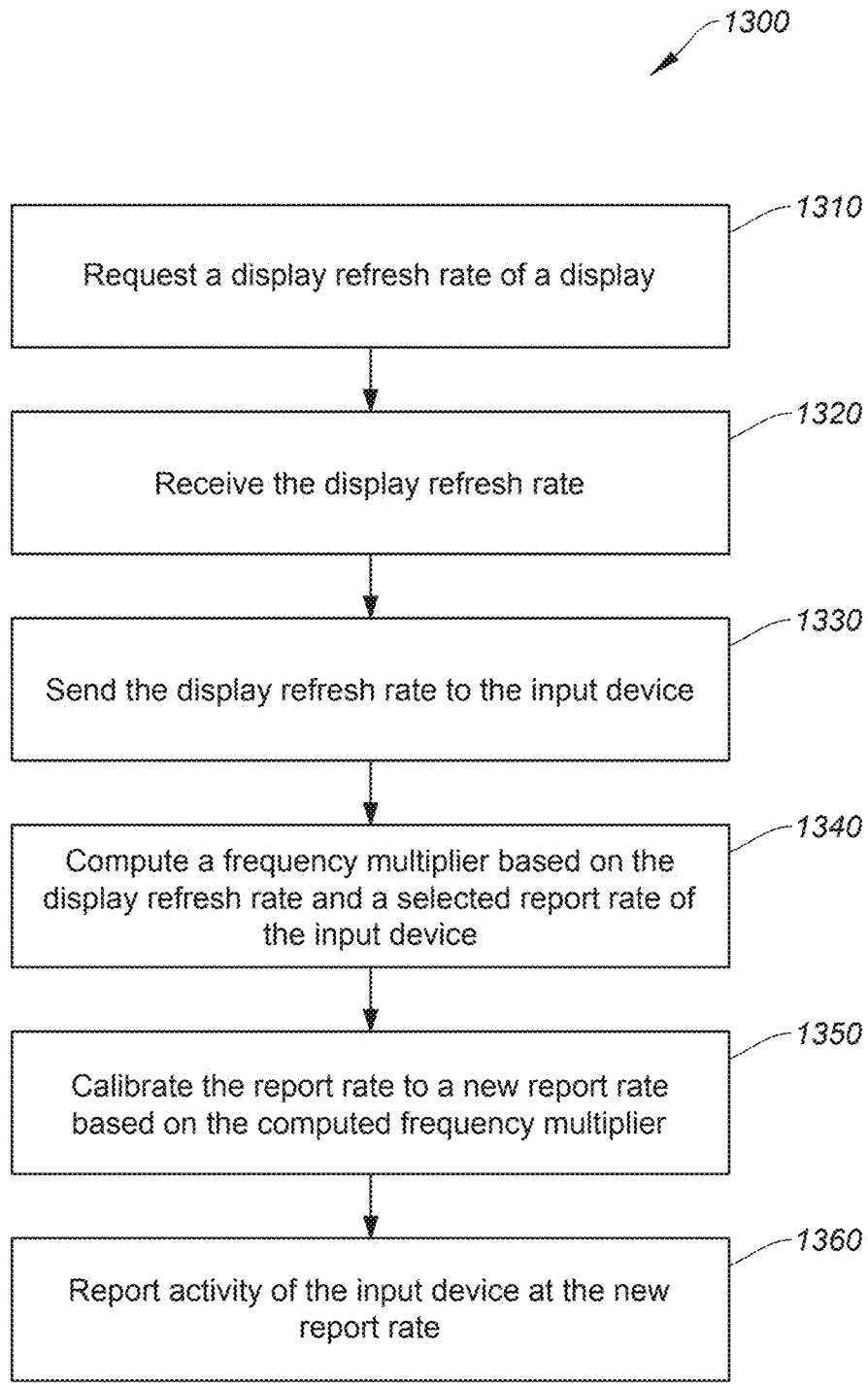
FIG. 13 is a simplified flow chart showing aspects of a method for synchronizing a report rate for an input device and a refresh rate of a display device, according to certain embodiments.

FIG. 13 is a simplified flow chart showing aspects of a method 1300 for synchronizing a report rate for an input device and a refresh rate of a display device, according to certain embodiments. Method 1300 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1300 can be performed by aspects of system 200 (e.g., processors 210), system 300 (e.g., processor(s) 302), a tertiary computing device (e.g., USB transceiver), or a combination thereof.

At operation 1310, method 1300 can include requesting, by a host computing device, a display refresh rate of a display, the display communicatively coupled to the host computing device, according to certain embodiments.

At operation 1320, method 1300 can include receiving, by the host computing device from the display, the display refresh rate, according to certain embodiments.

At operation 1330, method 1300 can include sending, by the host computing device to an input device (e.g., computer mouse), the display refresh rate, the input device communicatively coupled to the host computing device, according to certain embodiments. In some aspects, the operating system operating on the host computing device can perform operations 1310-1330. In some implementations, a computer peripheral controlling software ("interface hub") (e.g., Logitech G HUB) operating on the host computing device can perform operations 1310-1330.

At operation 1340, method 1300 can include computing, by the input device, a frequency multiplier based on the display refresh rate and a selected report rate of the input device, the report rate corresponding to a frequency at which the input device reports activity of the input device to the host computing device, according to certain embodiments. In some embodiments, the selected report rate is a user-defined report rate. In some cases, the input device is communicatively coupled to the host computing device via a human interface device (HID)-type communication protocol.

At operation 1350, method 1300 can include calibrating, by the input device, the report rate to a new report rate based on the computed frequency multiplier, according to certain embodiments.

At operation 1360, method 1300 can include reporting activity of the input device at the new report rate, according to certain embodiments.

In some instances where multiple displays are being used and the input device can control, for instance, a mouse cursor over the multiple displays, some aspects may include additional method steps including: requesting, by the host computing device, a second display refresh rate of a second display, the second display communicatively coupled to the host computing device; receiving, by the host computing device from the second display, the second display refresh rate; sending, by the host computing device to an input device, the second display refresh rate; computing, by the input device, a second frequency multiplier based on the second display refresh rate and the selected report rate of the input device; calibrating, by the input device, the report rate to a second new report rate based on the computed second frequency multiplier; reporting activity of the input device at the new report rate when the input device is interfacing with the display; and reporting activity of the input device at the second new report rate when the input device is interfacing with the second display. In some cases, the method can include modifying, by the input device, a dots-per-inch (DPI) setting of the input device based on the new report rate when the input device is interfacing with the display; and modifying, by the input device, DPI setting of the input device based on the second new report rate when the input device is interfacing with the second display.

It should be appreciated that the specific steps illustrated in FIG. 13 provide a particular method 1300 for synchronizing a report rate for an input device and a refresh rate of a display device, according to certain embodiments. Other sequences of steps may also be performed according to alternative embodiments. Furthermore, additional steps may be added or removed depending on the particular application. Any combination of changes can be used and one of ordinary skill in the art with the benefit of this disclosure would understand the many variations, modifications, and alternative embodiments thereof.

A simplified, high-level summary of certain embodiments of synchronizing a report rate for an input device and a refresh rate of a display device can include (1) a controlling software (e.g., Logitech G HUB) requests a value of a display frequency (e.g., monitor display refresh rate) from a display driver or directly from the OS (e.g., dmDisplayFrequency on MS Windows); (2) the controlling software sends the display frequency to the input device (e.g., computer mouse), using a suitable communication protocol (e.g., HID++ protocol); (3) the computer mouse computes the most appropriate multiple frequency factor, typically being closest to the desired user settings; (4) the computer mouse updates its polling rate (report rate) to match a frequency equal to the display frequency multiplied by the multiple frequency factor; and (5) once the polling rate (report rate) is updated inside the computer mouse embedded software, the computer mouse reports motion data at the desired frequency.

In some of the embodiments described above, the input device adapts (e.g., synchronizes) its report rate to the refresh rate of one or more display devices, or a multiple thereof. In some embodiments, as shown and described below with respect to FIG. 14, the synchronization occurs on the host computing device side, such as at the operating system level, a software control level (e.g., Logitech G Hub), at a wireless receiver level (USB transceiver coupled to the host computing device), or other device, and any combination thereof.

Figure 14:
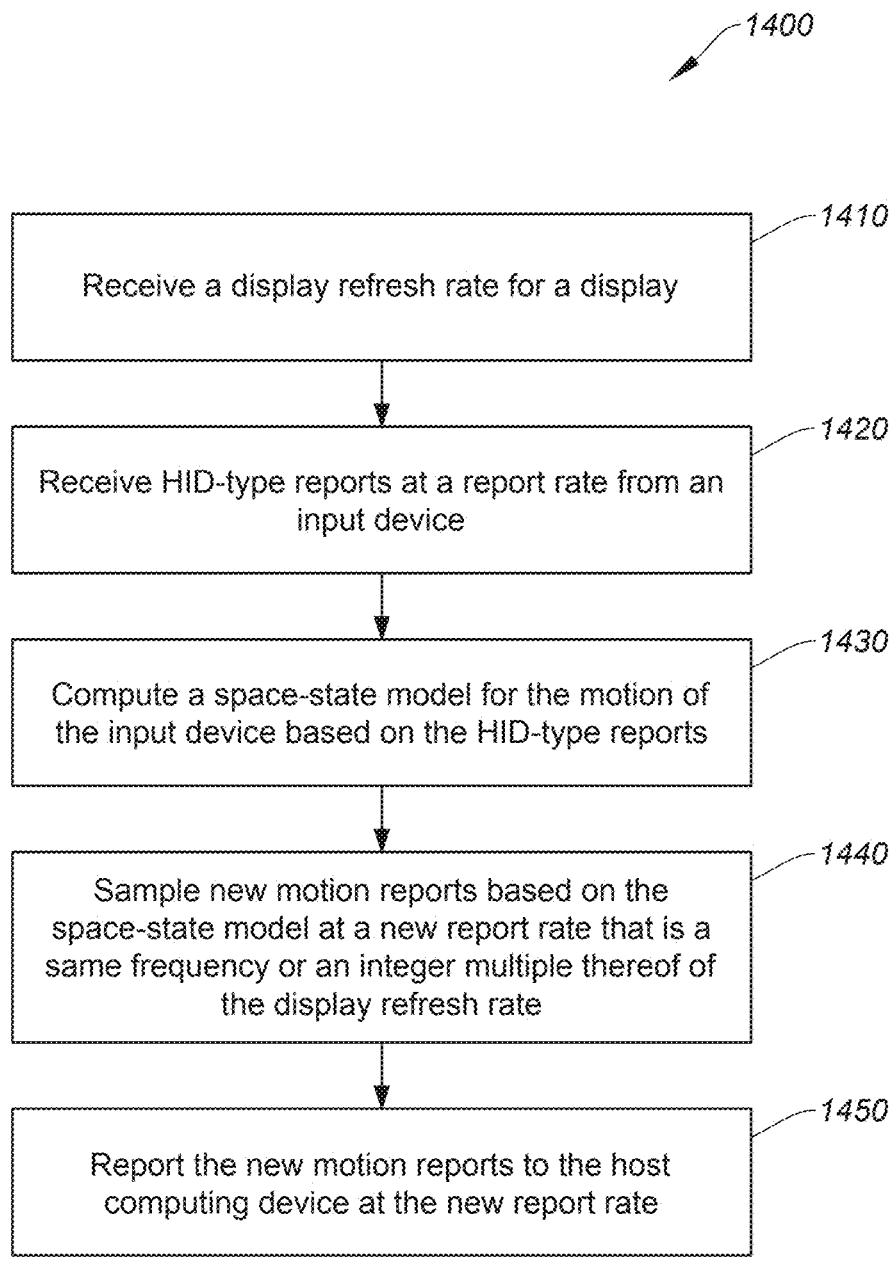
FIG. 14 is a simplified flow chart showing aspects of a method for synchronizing a report rate for an input device and a refresh rate of a display device, according to certain embodiments.

FIG. 14 is a simplified flow chart showing aspects of a method 1400 for synchronizing a report rate for an input device and a refresh rate of a display device, according to certain embodiments. Method 1400 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1400 can be performed by aspects of system 200 (e.g., processors 210), system 300 (e.g., processor(s) 302), a tertiary computing device (e.g., USB transceiver), or a combination thereof.

At operation 1410, method 1400 can include receiving, by a radio-frequency (RF) receiver, a display refresh rate for a display, both the display and the RF receiver being communicatively coupled to the host computing device, according to certain embodiments.

At operation 1420, method 1400 can include receiving, by the RF receiver from an input device, human interface device (HID)-type reports at a report rate, the HID-type reports including data corresponding to a motion of the input device, according to certain embodiments. In some embodiments, the RF receiver receives the display refresh rate from a computer peripheral device controlling software operating on the host computing device.

At operation 1430, method 1400 can include computing, by the RF receiver from an input device, a state-space model for the motion of the input device based on the HID-type reports, according to certain embodiments. In some aspects, the state-space model includes a velocity, acceleration, and jerk of the input device. The state-space model may be processed using a Kalman-type filter. In some cases, the input device can be a computer mouse.

At operation 1440, method 1400 can include sampling, by the RF receiver, new motion reports based on the state-space model at a new report rate that is a same frequency or an integer multiple thereof of the display refresh rate, according to certain embodiments.

At operation 1450, method 1400 can include reporting the new motion reports to the host computing device at the new report rate, according to certain embodiments.

It should be appreciated that the specific steps illustrated in FIG. 14 provide a particular method 1400 for synchronizing a report rate for an input device and a refresh rate of a display device, according to certain embodiments. Other sequences of steps may also be performed according to alternative embodiments. Furthermore, additional steps may be added or removed depending on the particular application. Any combination of changes can be used and one of ordinary skill in the art with the benefit of this disclosure would understand the many variations, modifications, and alternative embodiments thereof.

A simplified, high-level summary of certain embodiments of synchronizing a report rate for an input device and a refresh rate of a display device from a host computing device side (rather than on the input device side) can include (1) a controlling software (e.g., Logitech G HUB) requests the value of a display frequency (monitor display refresh rate) from the display driver or directly from the OS (e.g., dmDisplayFrequency on MS Windows) and sends it to the computer mouse RF USB receiver; (2) the computer mouse motion reports are sent in a standard way to the RF receiver (e.g., via HID-type commands); (3) the RF receiver receives the computer mouse motion reports and processes them into a state-space model (e.g., velocity, acceleration, jerk, additional derivatives, etc.) using a Kalman filter; and (4) the RF receiver microcontroller samples new motion reports based on the state-space model, at the same frequency as the display frequency or at a frequency corresponding to an integer multiple of the display frequency. Note that the RF receiver microcontroller (e.g., USB transceiver) is described, however the RE receiver steps can be performed by other elements, such as the OS, directly from a software (e.g., game) engine in the particular (e.g., game) software, a GPU of a graphics card(s), on the cloud, e.g., for video conferencing applications to compensate for mouse movement latency and to synchronize with the video streaming encoding, or other controlling software.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase®. and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer-implemented method comprising:
   requesting, by a host computing device, a display refresh rate of a display, the display communicatively coupled to the host computing device;
   receiving, by the host computing device from the display, the display refresh rate;
   sending, by the host computing device to an input device, the display refresh rate, the input device communicatively coupled to the host computing device;
   computing, by the input device, a frequency multiplier based on the display refresh rate and a selected report rate of the input device, the report rate corresponding to a frequency at which the input device reports activity of the input device to the host computing device;
   calibrating, by the input device, the report rate to a new report rate based on the computed frequency multiplier; and
   reporting activity of the input device at the new report rate.

2. The computer-implemented method of claim 1 wherein an operating system (OS) operating on the host computing device requests and receives the display refresh rate from the display.

3. The computer-implemented method of claim 1 wherein a computer peripheral controlling software operating on the host computing device requests and receives the display refresh rate from the display.

4. The computer-implemented method of claim 1 wherein the selected report rate is a user-defined report rate.

5. The computer-implemented method of claim 1 wherein the input device is communicatively coupled to the host computing device via a human interface device (HID)-type communication protocol.

6. The computer-implemented method of claim 1 wherein the input device is a computer mouse.

7. The computer-implemented method of claim 1 further comprising:
   requesting, by the host computing device, a second display refresh rate of a second display, the second display communicatively coupled to the host computing device;
   receiving, by the host computing device from the second display, the second display refresh rate;
   sending, by the host computing device to an input device, the second display refresh rate;
   computing, by the input device, a second frequency multiplier based on the second display refresh rate and the selected report rate of the input device;
   calibrating, by the input device, the report rate to a second new report rate based on the computed second frequency multiplier;
   reporting activity of the input device at the new report rate when the input device is interfacing with the display; and
   reporting activity of the input device at the second new report rate when the input device is interfacing with the second display.

8. The computer-implemented method of claim 7 further comprising:
   modifying, by the input device, a dots-per-inch (DPI) setting of the input device based on the new report rate when the input device is interfacing with the display; and
   modifying, by the input device, DPI setting of the input device based on the second new report rate when the input device is interfacing with the second display.

9. A computer-implemented method comprising:
   receiving, by an input device from a host computing device, a display refresh rate for a display, both the display and the input device being communicatively coupled to the host computing device;
   computing, by the input device, a frequency multiplier based on the display refresh rate and a selected report rate of the input device, the report rate corresponding to a frequency at which the input device reports activity of the input device to the host computing device;
   calibrating, by the input device, the report rate to a new report rate based on the computed frequency multiplier; and
   reporting activity of the input device at the new report rate.

10. The computer-implemented method of claim 9 wherein an operating system (OS) operating on the host computing device requests and receives the display refresh rate from the display.

11. The computer-implemented method of claim 9 wherein a computer peripheral controlling software operating on the host computing device requests and receives the display refresh rate from the display.

12. The computer-implemented method of claim 9 wherein the selected report rate is a user-defined report rate.

13. The computer-implemented method of claim 9 wherein the input device is communicatively coupled to the host computing device via a human interface device (HID)-type communication protocol, and wherein the input device is a computer mouse.

14. The computer-implemented method of claim 9 further comprising:

requesting, by the host computing device, a second refresh rate of a second display, the second display communicatively coupled to the host computing device;

receiving, by the host computing device from the second display, the second display refresh rate;

sending, by the host computing device to an input device, the second display refresh rate;

computing, by the input device, a second frequency multiplier based on the second display refresh rate and the selected report rate of the input device;

calibrating, by the input device, the report rate to a second new report rate based on the computed second frequency multiplier;

reporting activity of the input device at the new report rate when the input device is interfacing with the display; and reporting activity of the input device at the second new report rate when the input device is interfacing with the second display.

15. A computer-implemented method comprising:

receiving, by a computing device, a display refresh rate for a display, both the display and the computing device being communicatively coupled to a host computing device;

receiving, by the computing device from an input device, human interface device (HID)-type reports at a report rate, the HID-type reports including data corresponding to a motion of the input device;

computing, by the computing device from an input device, a state-space model for the motion of the input device based on the HID-type reports;

sampling, by the computing device, new motion reports based on the state-space model at a new report rate that is a same frequency or an integer multiple thereof of the display refresh rate; and reporting the new motion reports to the host computing device at the new report rate.

16. The computer-implemented method of claim 15 wherein the computing device is one of:

a radio-frequency (RF) receiver;

computer peripheral controlling software;

operating system; or game engine running inside a game software.

17. The computer-implemented method of claim 15 wherein the state-space model includes a velocity, acceleration, and jerk of the input device.

18. The computer-implemented method of claim 17 wherein the state-space model is processed using a Kalman-type filter.

19. The computer-implemented method of claim 18 wherein the input device is a computer mouse.

20. The computer-implemented method of claim 15 wherein the computing device receives the display refresh rate from a computer peripheral device controlling software operating on the host computing device.

* * * * *